(12) United States Patent
Jalali et al.

(10) Patent No.: US 6,938,064 B1
(45) Date of Patent: Aug. 30, 2005

(54) METHOD FOR COMPUTING FAST FOURIER TRANSFORM AND INVERSE FAST FOURIER TRANSFORM

(75) Inventors: Ali Jalali, Rennes (FR); Pierre Leray, Liffre (FR); Dominique Lacroix, Ronnes (FR)

(73) Assignees: France Telecom SA, Paris (FR); Telediffusion de France SA, Paris, Cedex (FR)

( * ) Notice: Subject to any disclaimer, the term of this patent is extended or adjusted under 35 U.S.C. 154(b) by 0 days.

(21) Appl. No.: 09/581,272

(22) PCT Filed: Dec. 7, 1998

(86) PCT No.: PCT/FR98/02636

§ 371 (c)(1),
(2), (4) Date: Oct. 17, 2002

(87) PCT Pub. No.: WO99/30251

PCT Pub. Date: Jun. 17, 1999

(30) Foreign Application Priority Data

Dec. 8, 1997 (FR) .......................................... 97 15737

(51) Int. Cl.$^7$ .............................................. G06F 17/14
(52) U.S. Cl. ..................................................... 708/404
(58) Field of Search ................................. 708/403–405

(56) References Cited

U.S. PATENT DOCUMENTS 3,584,781 A * 6/1971 Edson ......................... 708/404
3,584,782 A * 6/1971 Bergland ..................... 708/404
4,051,357 A * 9/1977 Bonnerot ..................... 708/405
4,612,626 A    9/1986 Marchant ..................... 364/726
5,270,953 A   12/1993 White ....................... 364/724.18
6,401,162 B1 * 6/2002 Nasserbakht .................... 711/5

OTHER PUBLICATIONS

*An Algorithm for the Machine Calculation of Complex Fouier Series*, J.W. Cooley, J.W. Tukey, pp. 297–301, Apr. 1965.

*Software Implementation of 2D FFT on DSP 96002 Digital Signal Processor*, S.C. Chan et al., pp. 1525–1528, Aug. 1992.

*Cooley–Tukey FFT on the Connection Machine*, S. Lennart Johnsson et al., pp. 1201–1221, Nov. 1992.

* cited by examiner

*Primary Examiner*—D. H. Malzahn
(74) *Attorney, Agent, or Firm*—Patterson, Thuente, Skaar & Christensen, P.A.

(57) ABSTRACT

A method of calculating the fast Fourier transform or the inverse fast Fourier transform of a series of N real samples x(n), with N power of two, operating according to a time interleaving algorithm and providing the sample series X(n) in ascending order to index n and using limited calculating storage means. A method of calculating the fast Fourier transform or the inverse fast Fourier transform of a series of N conjugated complex samples X(n), with N power of two, operating according to a frequency interleaving algorithm.

44 Claims, 17 Drawing Sheets

METHOD FOR COMPUTING FAST FOURIER TRANSFORM AND INVERSE FAST FOURIER TRANSFORM

BACKGROUND OF THE INVENTION

1. Field of the Invention

This invention relates to a method of calculating the fast Fourier transform or the inverse fast Fourier transform of a series of real numbers or a series of conjugated complex samples.

2. Description of the Related Art

The Fourier transform is probably one of the most important tools for analyzing, designing and implementing signal processing algorithms, and the existence of efficient algorithms, such as that of the fast Fourier transform, has been a major factor for this situation. Although most Fourier transform algorithms are designed for transforming series of complex numbers, there are, however, various applications, such as image or acoustic signal processing or certain types of multicarrier modulation wherein the series to be transformed are real numbers.

In general, the direct Fourier transform and the inverse Fourier transform respectively set up the following relations between two series of N complex numbers, x(n) and X(n):

$$X(n) = \sum_{k=0}^{N-1} x(k) w^{kn} \text{ with } n \in [0 \ldots N-1] \text{ and } w^{kn} = e^{-j\frac{2\pi kn}{N}}$$

$$x(n) = \frac{1}{N} \sum_{k=0}^{N-1} X(k) w^{-kn} \text{ with } n \in [0 \ldots N-1]$$

In 1965, J. W. Cooley and J. W. Tukey described an algorithm allowing to rapidly calculate the Fourier transform of a series of N complex numbers in an article entitled "An Algorithm for the Machine Calculation of Complex Fourier Series", Math. Computation, Vol. 19, 1965, pp. 297–301. This algorithm is very interesting when N is a power of two because it is then particularly straightforward to implement. This algorithm requires $\mu$ calculation steps where $\mu = \log_2(N)$. It is based on breaking down the series to be transformed into two interleaved sub-series. There are two kinds of interleaving: time interleaving and frequency interleaving. Both kinds of interleaving are explained more in detail in the course of the description with reference to FIGS. 1A and 1B.

Specific algorithms have been developed from this basic algorithm to deal with the case of real number series. The Fourier transformation of a series of 8 real numbers according to a time interleaving algorithm and according to a frequency interleaving algorithm is illustrated in FIGS. 1A and 1B. For each time interleaving Fourier transform algorithm there is a frequency interleaving algorithm, which corresponds to a double inversion of the series of transformation operations, on the one hand, and for each butterfly circuit, of the proper transformation operations, on the other hand. Whatever the interleaving chosen, the transformation method requires three transformation steps E0, E1, and E2, these steps being implemented through a set of four butterfly circuits CC, generally known as "butterflies" in technical speak. Each butterfly, represented in the figure by a point of intersection between two columns of numbers, performs calculations on two numbers, real or complex. The symbols R and C respectively identify a real number and a complex number. The sequence of real and/or complex numbers after the transformation steps depends on the interleaving chosen.

The time interleaving algorithm is generally chosen for calculating the Fourier transform of a series of real numbers because of the symmetrical distribution of real and complex numbers throughout the steps. On the other hand, the frequency interleaving algorithm is more suitable for the direct or inverse transformation of a series of conjugated complex numbers.

When the series to be transformed x(n) is real, the Fourier transform verifies the following relation:

x(n) is real if and only if $$X(n)=X^*(-n)=X^*(N-n); \qquad (1)$$

where * designates the conjugating operation.

For a series x(n) of N real numbers, the following results are inferred from this relation:

–X(0) and X(N/2) are real;

$$-X(n)=X^*(N-n) \text{ for } 1 \leq n \leq N/2 - 1$$

Relation (1) highlights the presence of redundant information in the X(n) series.

It should be noted that the transformation method is generally implemented by a single set of butterflies, the operating mode of which is modified as the transformation goes along. At each change of operating mode, results are stored in a memory having N storage locations, the output samples of a butterfly replacing the corresponding input samples of the same rank in the memory. This method of applying the algorithm is generally known as the "in place" method. This method has a major advantage: if the elements of the x(n) series are processed in the first transformation step in bit-reversed order of index n, the numbers of the X(n) series are output in the last transformation step in ascending order of index n and vice versa.

A known transformation method is shown by way of example in FIG. 2. This method performs the Fourier transformation of a real x(n) series according to a complex time interleaving algorithm. In this example, the x(n) series to be transformed comprises sixteen real samples, x(0) to x(15). The transformation method comprises four transformation steps $E_p$ with $0 \leq p \leq 3$. The samples of the x(n) series are shown in the first transformation step in bit-reversed order of their index n.

At this stage of the explanations, the terms used in the course of the description should be defined. The rank of a sample is taken from the position it occupies in the series of samples to which it belongs. The index of a sample then corresponds to the starting rank of this sample.

The intermediate results obtained in the various transformation steps are represented by the series A(n), B(n), and C(n). The samples of the series x(n), A(n), B(n), C(n), and X(n) are stored in double storage locations, one storage location being reserved for the real portion of the sample and the other location being reserved for the imaginary portion thereof. $A_R(n)$ and $A_I(n)$ respectively designate the real portion and the imaginary portion of the index n sample of the A(n) series. Butterflies are represented in the figure by points of intersection between columns of storage locations. Each butterfly is assigned a coefficient $w^s$ symbolized in FIG. 2 by a pair of coordinates A/B where A and B respectively designate the real portion and the imaginary portion of the coefficient $W^s$. Coordinates 1/0 and 0/−1 are respectively assigned to coefficients $W^0=1$ and $W^{N/4}=W^4=-j$. For the sake of clarity and in order to simplify their formulation, the remaining coefficients $W^s$ have been represented by the following pairs:

$W^1 \rightarrow 2/-4$ $W^2 \rightarrow 3/-3$ $W^3 \rightarrow 4/-2$ $W^5 \rightarrow -4/-2$ $W^6 \rightarrow -3/-3$ $W^7 \rightarrow -2/-4$ These pairs of coordinates are graphically represented in FIG. 3. In fact, coordinates A and B respectively represent a cosine value and a sine value. This coefficient $W^S$ participates in the calculation performed by the butterfly. Furthermore, the butterflies are distributed at each transformation step among $N/2^{p+1}$ calculation blocks, each calculation block comprising $2^p$ butterflies. In the course of the description, the parameter q designates the rank of the calculation blocks within the same transformation step; q is included between 0 and $(N/2^{p+1})-1$.

In the first transformation step $E_0$, the butterflies are distributed among eight calculation blocks, each comprising a butterfly performing an operation on two complex or real samples. If e1 and e2 are to designate the samples applied to the inputs of a butterfly, the latter outputs samples s1 and S2 defined as follows:

$$s1=e1+W^S.e2 \text{ and } s2=e1-(W^S.e2)$$

where $W^S$ is the coefficient assigned to said butterfly.

For this first transformation step, coefficient $W^0=1$ is assigned to the eight butterflies. As the samples x(n) and the coefficient $W^0$ are real, the samples A(n) obtained at the end of step $E_0$ are real.

For the second transformation step, $E_1$, the butterflies are distributed among four calculation blocks each comprising two butterflies. Coefficient $W^0=1$ is assigned to the first one of these butterflies; thus, the first butterfly of each calculation block provides two real samples. The second butterfly of the calculation blocks is associated with coefficient $W^{N/4}=W^4=-j$ and generates two conjugated complex samples. The output samples obtained at the end of step $E_1$ are designated by the series B(n).

For the third transformation step, $E_2$, the butterflies are distributed among two calculation blocks each comprising four butterflies respectively associated with coefficients $W^0$, $W^2$, $W^4$, and $W^6$. The output samples in step $E_2$ are designated by the series C(n). Finally, for the fourth transformation step, $E_3$, a single calculation block comprising eight butterflies respectively associated with coefficients $W^0$, $W^1$, $W^2$, $W^3$, $W^4$, $W^5$, $W^6$, and $W^7$, is provided. This transformation step generates the transformed series X(n).

Given relation (1), the X(n) series comprises, on the one hand, real samples, X(0) and X(8), and on the other hand, complex samples, X(1) to X(7) and X(9) to X(15), samples X(15) to X(9) respectively being the conjugates of samples X(1) to X (7). The X(n) series therefore contains redundant information. The storage locations outlined in thick stroke in FIG. 2 designate the storage locations enclosing the conjugated values of the complex samples contained in the storage locations associated therewith by an arrow. The intermediate results series B(n) and C(n) also contain redundant information.

It is then possible to delete this redundant information in order to reduce by half the size of the sample storage memory as well as the number of butterflies.

However, removing redundant information stored in the storage locations outline in bold strokes in FIG. 2 implies the complete reorganization of the transformation steps of FIG. 2. Thus reorganizing the transformation steps has the effect of modifying the output sequence of samples X(n).

The problem therefore consists in reducing the size of the storage memory and the number of butterflies while maintaining the output sequence of the X(n) samples. It is the object of the invention to offer a method of calculating the fast Fourier transform or the inverse fast Fourier transform of a series of N real samples x(n), with N power of 2, operating according to a time interleaving algorithm, which provides the series of samples X(n) in ascending order of index n and uses limited calculation and storage means.

OBJECTS AND SUMMARY OF THE INVENTION

For this purpose, the object of the invention is a method of calculating the fast Fourier transform or the inverse fast Fourier transform of a digital signal defined by a series of N real starting samples x(n), with N power of two and n ∈ [0 . . . N–11], comprising successive transformation steps for transforming input samples into output samples, all the transformation steps being performed by means of a single set of butterflies with several inputs and several outputs, the operating mode of which is modified selectively in each transformation step, the input and output samples of each transformation step being stored in a storage memory, a series of N output samples y(n) representative of the fast Fourier transform or the inverse fast Fourier transform of the starting samples x(n) being provided in the last transformation step, characterized in that output samples y(n) are real, and in that the output samples of a butterfly replace the corresponding input samples of the same rank in the storage memory, so that, if the starting samples x(n) processed in the first transformation step are classified in bit-reversed order of their index n, output samples y(n) are provided in the last transformation step in -ascending order of index n, these output samples being defined by the following relations:

| | |
|---|---|
| y(0) = Re[X(0)] | |
| y(n) = Re[X((n + 1)/2)] | for n being odd and different from N − 1 |
| y(n) = Im[X(n/2)] | for n being even and different from 0 |
| y(N − 1) = Re[X(N/2)] | | where the X(n) samples, with n ∈ [0 . . . N–1] designate the complex samples of the series corresponding to the fast or inverse fast Fourier transform of the series of starting samples x(n).

For methods operating according to a frequency interleaving algorithm, the invention also relates to a method of calculating the fast Fourier transform or the inverse fast Fourier transform of a digital signal defined by a series of N complex samples X(n) conjugated by pairs represented by a series of N real starting samples y(n), with N power of two and n ∈ [0 . . . N–1], the starting samples y(n) being defined as follows:

| | |
|---|---|
| y(0) = Re[X(0)] | |
| y(n) = Re[X((n + 1)/2)] | for n being odd and different from N − 1 |
| y(n) = Im[X(n/2)] | for n being even and different from 0 |
| y(N − 1) = Re[X(N/2)] | | this calculation method comprising successive transformation steps for transforming input samples into output samples, a series of N output samples x(n) representative of this fast or inverse fast Fourier transform being provided in the last transformation step, all the transformation steps being performed by means of a single set of butterflies with several inputs and several outputs, the operating mode of which is modified selectively in each transformation step, the input and output samples of each transformation step being stored in a storage memory, characterized in that output samples x(n) are real, and in that the output samples of a butterfly replace the corresponding input samples of the same rank in the storage memory, so that, if the starting samples y(n) processed in the first transformation step are classified in ascending order of index n, the output samples x(n) are output in the last transformation step in bit-reversed order of index n.

The inventive calculation methods perform operations on real samples and consequently use limited calculation and storage means in comparison with the method shown in FIG. 2.

According to another feature of the invention, in each transformation step, the butterflies transform input sample pairs, the ranks of the input samples of the same pair within the series of input samples of said transformation step being symmetrical with respect to a center between the end rank values of the input samples transformed by said butterfly. Input samples processed by the same butterfly are thus symmetrically linked together by pairs. The result is simplified handling of sample addressing.

According to another aspect of the invention, the method preferably comprises $\mu-1$ transformation steps $E_p$ with $\mu=\log_2(N)$ and $p \in [0 \ldots \mu 2]$.

BRIEF DESCRIPTION OF THE DRAWINGS

Other features and advantages of the invention will be apparent from reading the following detailed description, which is made with reference to the appended drawings, where.

DESCRIPTION OF THE PREFERRED EMBODIMENTS

According to the invention, only one part of the X(n) samples is calculated, the other part of the samples being redundant. E.g., the calculation could be limited to the X(n) numbers for $0 \leq n \leq N/2$. However, a more adequate solution is calculating the X(n) numbers for $0 \leq n \leq N/4$ and $N/2 \leq n \leq 3N/4$. The latter solution is preferable because it only involves the first (N/4)+1 butterflies for calculating X(n), as the last (N/4)−1 butterflies can be removed. The storage locations thus released can be used for storing the real portion or the imaginary portion of the remaining X(n) numbers. The size of the storage memory can thus be halved if the size of the storage locations is limited to storing a real number instead of a complex number. The real portion of the complex X(n) number is stored in the storage location that has been assigned thereto initially whereas the imaginary portion is stored in the storage location initially assigned to the number X(N−n). The same operation can be performed for the series of intermediate results B(n) and C(n). The transformation method of the invention is limited to calculating N real samples y(n) instead of N complex samples. The real samples y(n) are defined as follows:

| | |
|---|---|
| y(0) = Re[X(0)] | |
| y(n) = Re[X((n + 1)/2)] | for n being odd and different from N − 1 |
| y(n) = Im[X(n/2)] | for n being even and different from 0 |
| y(N − 1) = Re[X(N/2)]. | |

Figure 1A:
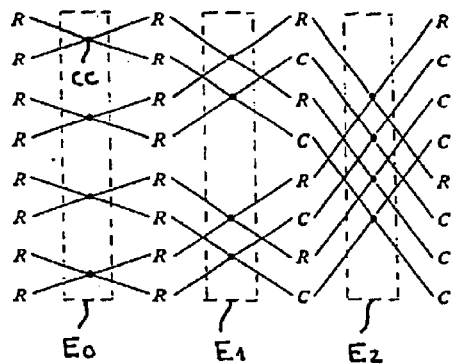
FIGS. 1A and 1B, already described, respectively represent a Fourier transformation of eight real numbers according to a time interleaving algorithm and according to a frequency interleaving algorithm.
Figure 1B:
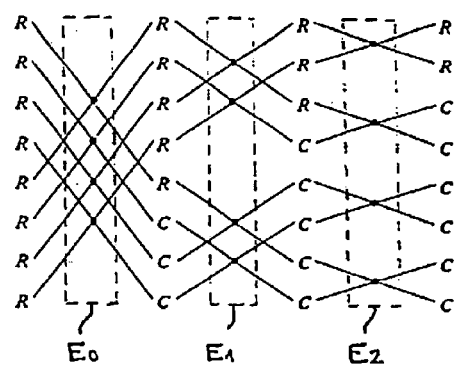
Figure 3:
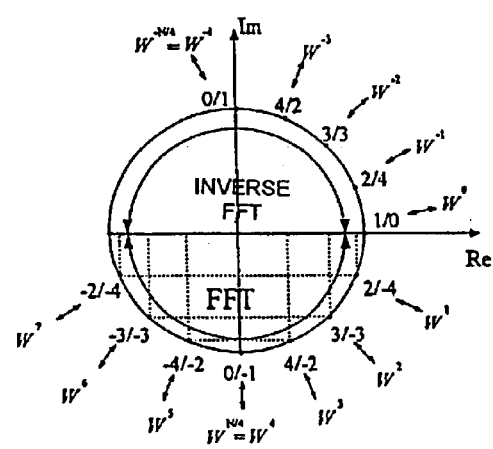
FIG. 3, already described, graphically represents the mapping of coefficients $W^S$ and coordinate pairs A/B.
Figure 2:
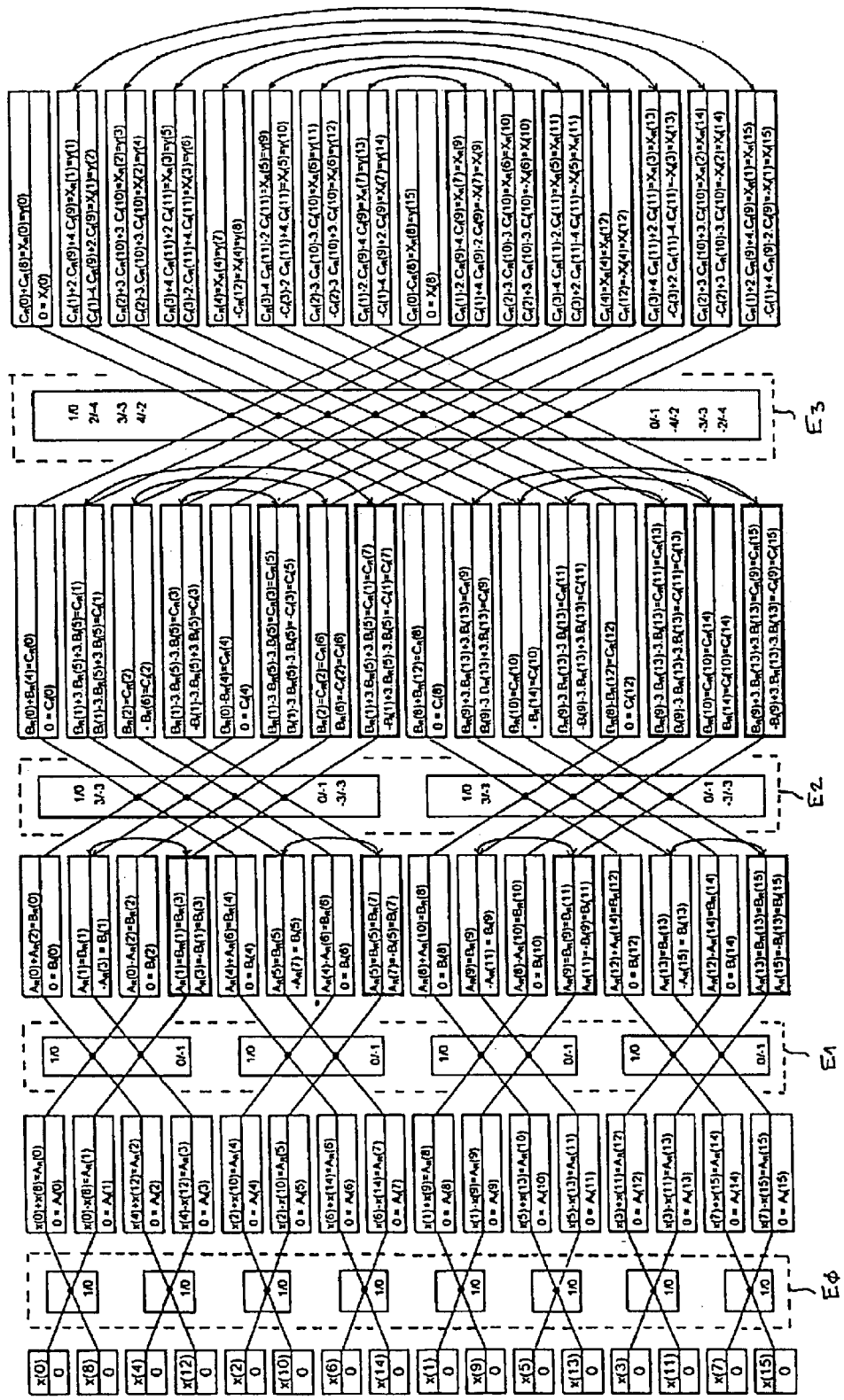
FIG. 2, already described, illustrates the transformation of a series of 16 real numbers into a series of 16 complex numbers according to a complex time interleaving algorithm.
Figure 4:
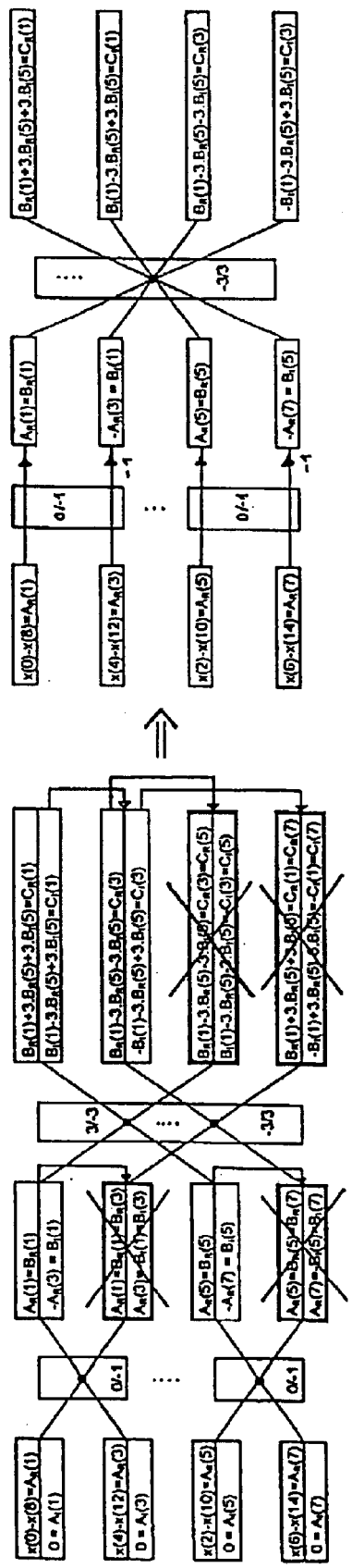
FIG. 4 represents modifications applied to part of the transformation of FIG. 2.

Removing redundant information and reorganizing storage locations deeply modifies the diagram of FIG. 2. FIG. 4 illustrates the reorganizations performed on the part relating to the calculation of samples A(1), A(3), A(5), A(7), B(1), B(3), B(5), B(7), C(1), C(3), C(5), and C(7). Redundant samples to be removed are B(3), B(7), C(5), and C(7). When the size of the storage locations has been reduced and the samples remaining in theses storage locations have been reorganized, the butterflies perform calculations on real numbers. The butterflies to which the pair 0/−1 is assigned perform calculations on two real numbers. In practice, they copy onto their first output the number present at their first input and multiply by −1 the number present at their second input and provide it to their second output. The butterflies to which the pair 1/0 is assigned perform an addition and a subtraction on two real numbers. Finally, the other butterflies perform operations on four real numbers.

Figure 5:
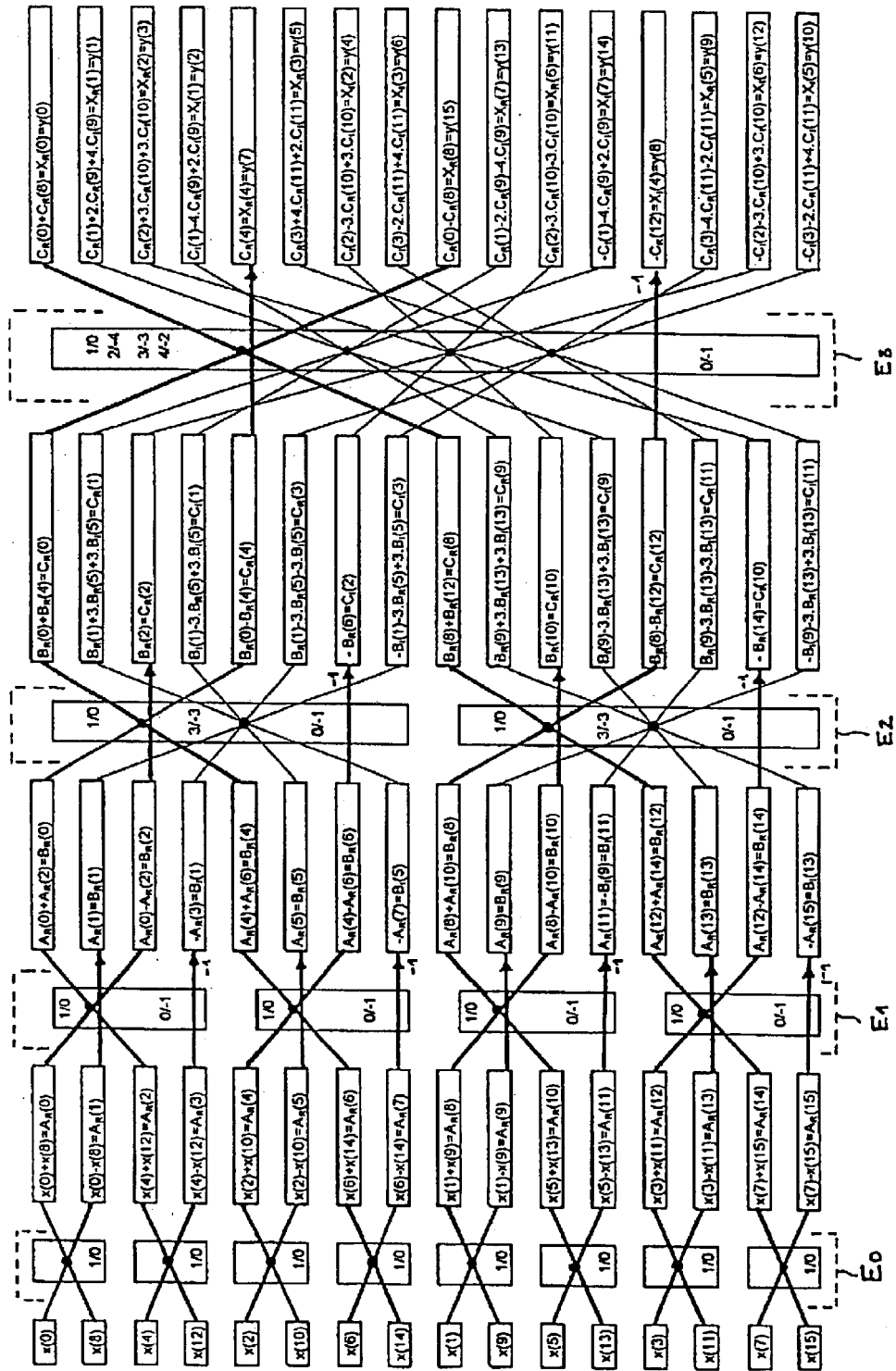
FIG. 5 illustrates a modified transformation only processing real numbers.

The transformation thus rearranged is illustrated in FIG. 5. In this figure, the butterflies associated with the pairs 1/0 and 0/1 corresponding to the coefficients $W^0$ and $W^4$ are connected with storage locations by thick strokes. This figure shows that the reorganization of the transformation method steps modifies the output sequence of the y(n) samples and therefore the output sequence of the X(n) series. Furthermore, this transformation method no longer has a specific symmetry allowing to link by pairs the samples processed by the same butterfly. The result is a very complicated address management of the samples to be applied to the butterfly inputs.

Figure 6:
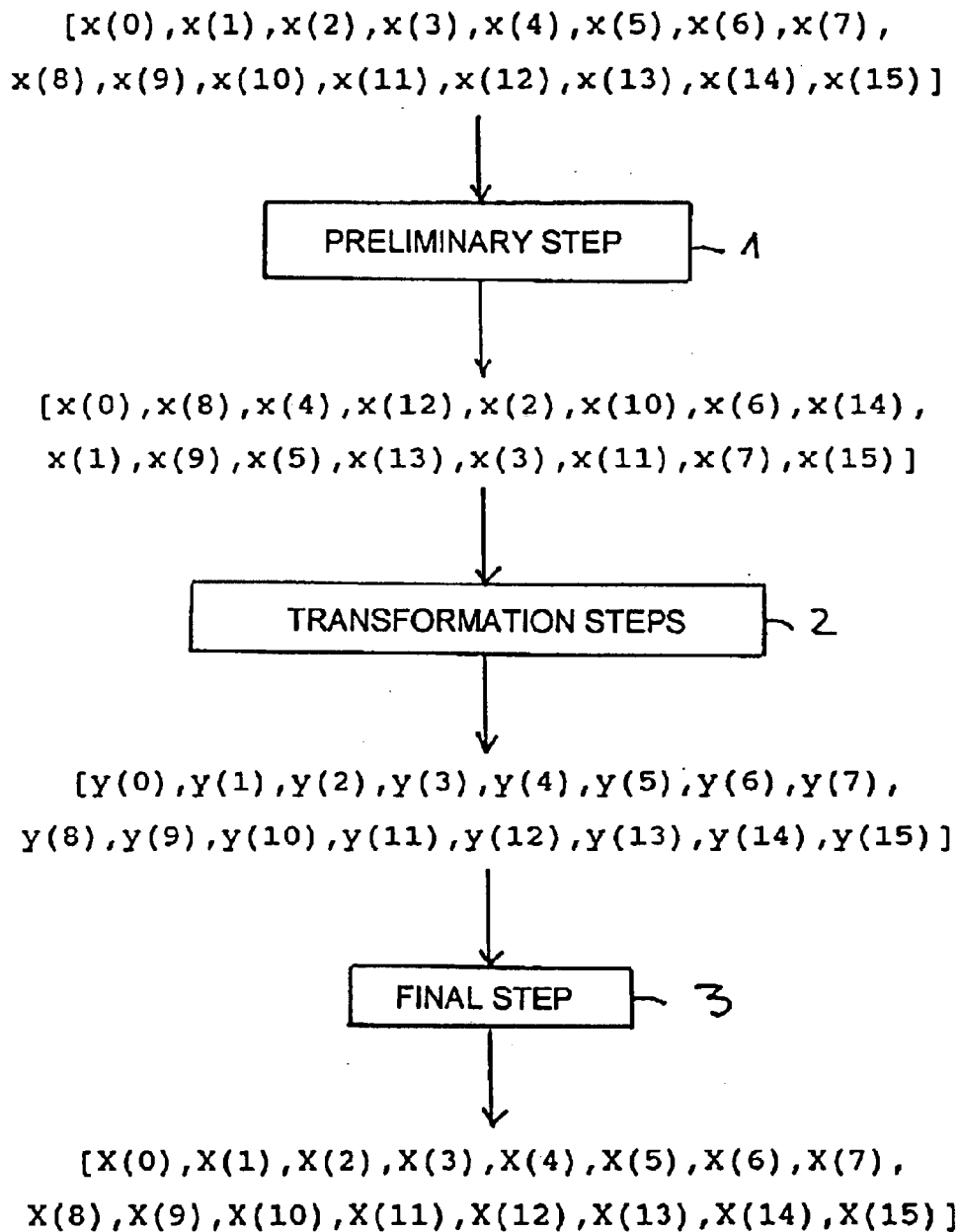
FIG. 6 is a representation of the method of calculating the fast Fourier transform according to the invention.

FIG. 6 shows the steps of a method of calculating the fast Fourier transform or the inverse fast Fourier transform of a series of N real numbers x(n), with N power of 2, operating according to a time interleaving algorithm. It mainly comprises transformation steps 2 for transforming N starting samples x(n) classified in bit-reversed order of their index n into real output samples y(n) representative of this Fourier transform classified in ascending order of index n.

Advantageously, it comprises a preliminary step 1 for ranking the N real starting samples x(n) to be transformed in the bit-reversed order of their index n if the samples x(n) are not already in this sequence and a final step 3 for generating the N complex samples X(n) corresponding to the fast Fourier transform of the starting samples x(n) from the N real samples y(n) obtained at the end of the transformation steps.

The methods that will be detailed in the course of the description will be more in particular for calculating the fast Fourier transform of a real series. Also, the coefficients $W^s$ assigned to the butterflies for implementing the inventive method will be of the type $e^{-j(2\pi s/N)}$ with $s \geq 0$. For calculating the inverse fast Fourier transform the calculation method is the same, however, the coefficient is of the type $e^{j(2\pi s/N)}$ with $s \geq 0$.

Figure 7A:
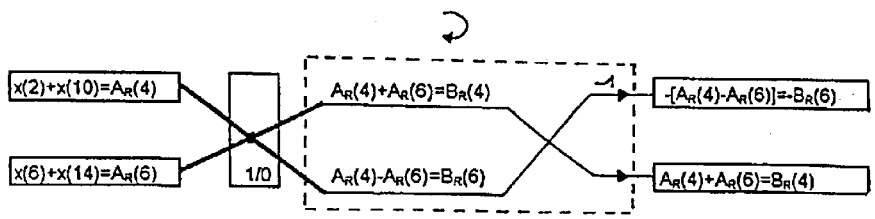
FIGS. 7A and 7B respectively illustrate permutations performed on peripheral butterflies and on internal butterflies with odd-numbered rank of the transformation of FIG. 5.
Figure 7B:
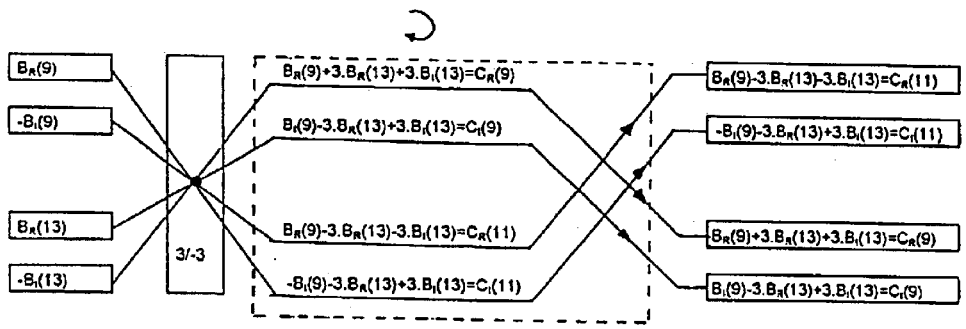

In order to obtain at the same time y(n) samples sorted in ascending order of index n and symmetry of calculation, according to the invention, it is suggested to modify the calculations performed by the butterflies of the odd rank q calculation blocks of the transformation illustrated in FIG. 5 in accordance with the diagrams of FIGS. 7A and 7B.

As the butterflies associated with coefficient 1/0 (FIG. 7A) of the odd rank calculation blocks are involved, provision is made for permutation both outputs of the butterfly and multiplying by −1 the result provided at the second butterfly output.

As the four input butterflies (FIG. 7B) are involved, provision is made for permutation the first two outputs with the last two ones.

Figure 8:
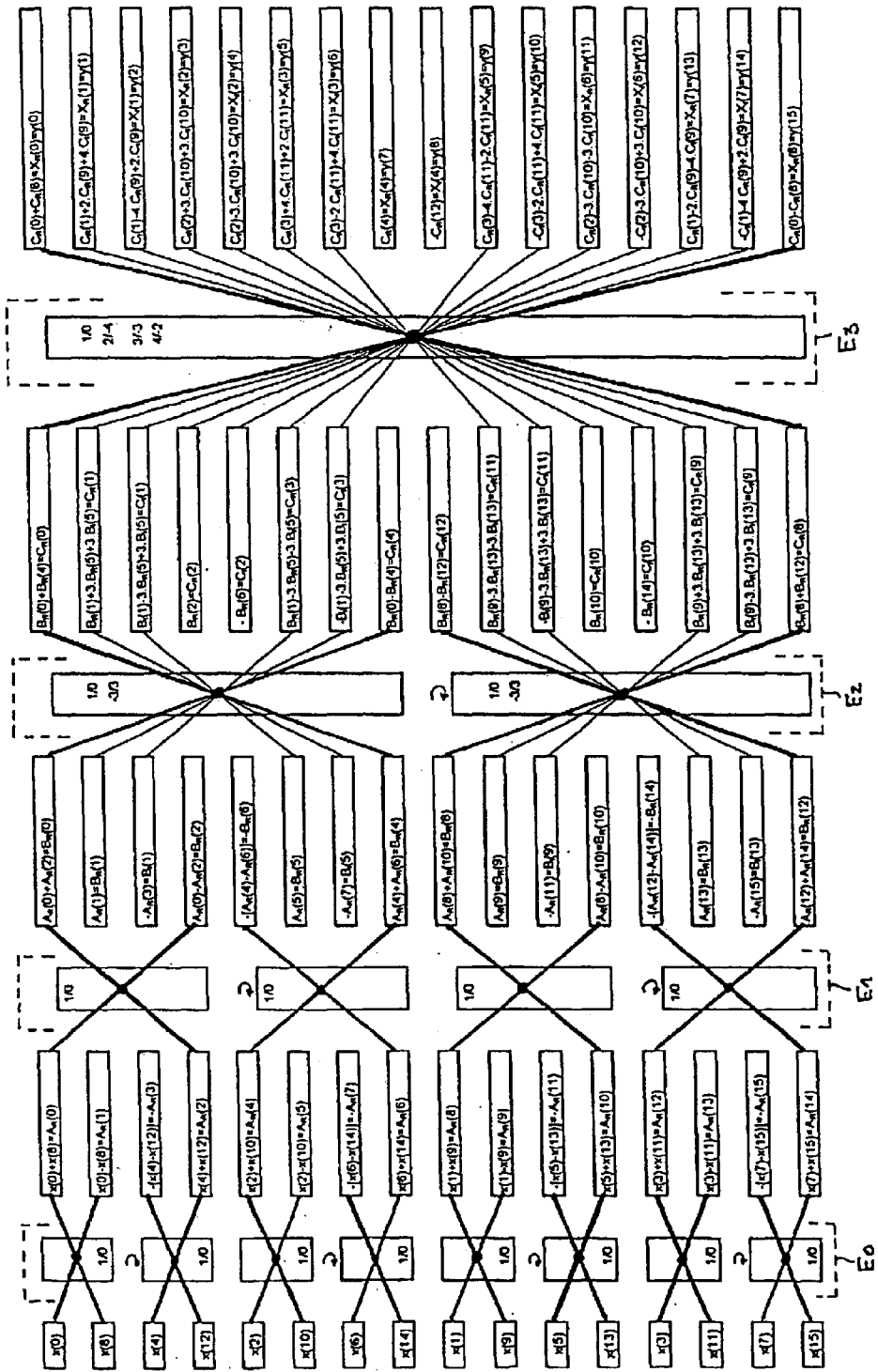
FIG. 8 represents an embodiment of the transformation method according to the invention, comprising $\mu$ transformation steps.

This method is applied to the whole transformation and then a method is obtained providing at the output y(n) samples in ascending order of index n. This method is illustrated in FIG. 8. The symbol ↭ placed above the calculation blocks designates the calculation blocks wherein butterflies have been modified, i.e. odd rank calculation blocks. Due to the symmetry of calculation of the transformation method, the intersecting points representing the butterflies are superposed inside each calculation block.

The butterflies to which the coefficient 1/0 is assigned are called peripheral butterflies because they perform calculations on samples arranged at the ends of the calculation block. The other butterflies are called internal butterflies. It should be noted that in each transformation step, not all the samples are processed always and that unprocessed samples are kept in their storage locations to be processed in subsequent steps, or else produced as output if they are already in their final shape.

The transformation method thus modified provides y(n) samples in ascending order of index n and, in each transformation step, has symmetry of calculation facilitating the addressing of the samples to be processed.

According to another aspect of the invention, the calculation method advantageously comprises $\mu-1$ transformation steps. Several embodiments derived from that of FIG. 8 and comprising $\mu-1$ transformation steps are therefore shown in the course of the description. One butterfly design is associated with each of these embodiments.

All of these embodiments have the following features in common:

in each transformation step, provision is made for $N/2^{p+2}$ calculation blocks and each calculation block comprises an peripheral butterfly and/or $2^p-1$ internal butterflies; all butterflies, be they peripheral or internal, perform calculations on four real samples;

the ranks of the samples processed by the same butterfly are defined as follows: if, in transformation step $E_\beta$, a peripheral butterfly belonging to the rank $\alpha$ calculation block is taken into consideration, it transforms the input samples of rank $2^{\beta+2}\alpha$, $2^{\beta+2}\alpha+2^{\beta+1}-1$, $2^{\beta+2}\alpha+2_{\beta+1}$, $2^{\beta+2}\alpha+2^{\beta+2}-1$ into output samples of the same rank, and, if an internal rank $\tau$ butterfly in a rank $\alpha$ calculation block is taken into consideration in step $E_\beta$, it transforms the input samples of rank $2^{\beta+2}\alpha+2\tau+1$, $2^{\beta+2}\alpha+2\tau+2$, $2^{\beta+2}\alpha+2^{\beta+2}-2\tau-3$, $2^{\beta+2}\alpha+2^{\beta+2}-2\tau-2$ into output samples of the same rank, with $\beta \geq 1$;

the coefficient assigned to the internal rank $\tau$ butterfly of the rank $\alpha$ calculation block in step $E_\beta$ is equal to $W^\delta$ with $\delta=(\tau+1).(N/2^{\beta+2})$.

In all of these embodiments, the input samples of each butterfly form sample pairs, the sample ranks of the same pair in the series of input samples of a transformation step being symmetrical with respect to the center value of the end ranks of the input samples transformed by said butterfly. This center corresponds to the value $2^{\beta+2}\alpha+2^{\beta+1}-1/2$. Therefore, one just has to know the rank of two of the four samples to be applied to the inputs of the butterfly in order to infer therefrom the rank of the other two. Addressing these samples is thus simplified. This will be explained more in detail at a later point of the description.

Figure 9:
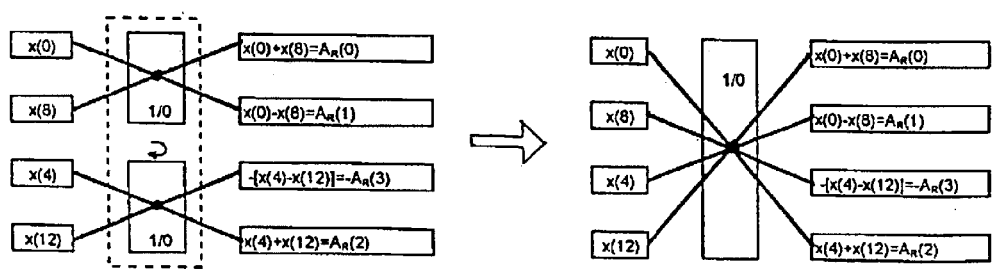
FIG. 9 illustrates a grouping of peripheral butterflies according to a first embodiment of a transformation method comprising $\mu-1$ transformation steps.
Figure 10:
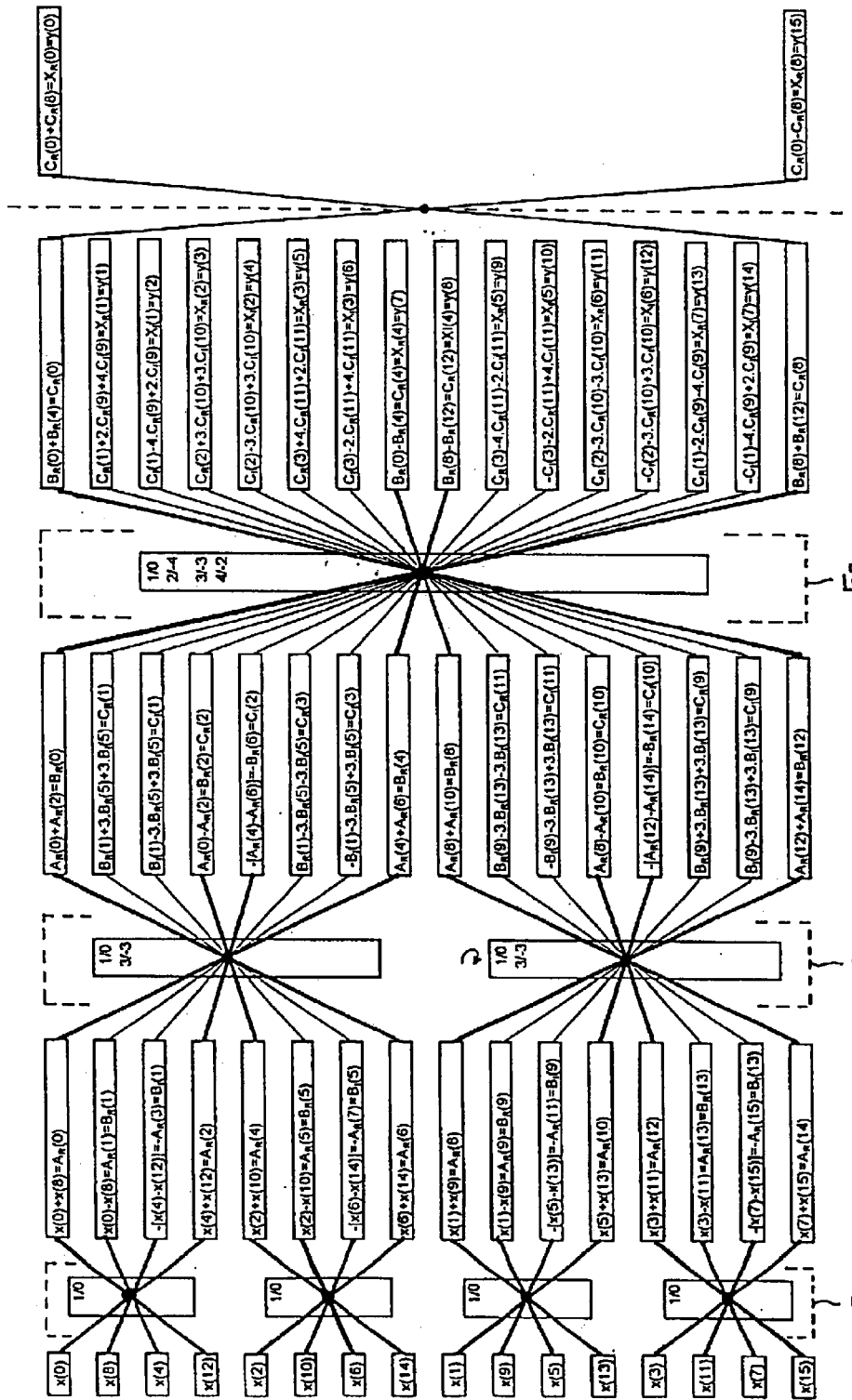
FIG. 10 represents a first embodiment of a transformation method comprising $\mu-1$ transformation steps.

Thus, according to a first embodiment, the neighboring calculation blocks in each transformation step are grouped by pairs. The peripheral butterflies of the same calculation block are then merged into a single peripheral butterfly. A sample merging of two peripheral butterflies is shown in FIG. 9. This example relates to peripheral butterflies associated with samples x(0), x(8), x(4), and x(12) Furthermore, as the transformation steps do not process all samples each time, certain calculations can be anticipated. E.g., calculating samples $C_R(1)$, $C_I(1)$, $C_R(3)$, and $C_I(3)$ can be done in the second transformation step. The result is the diagram of FIG. 10 showing a first embodiment of the transformation circuit wherein the method only comprises $\mu-1$ transformation steps. In transformation step $E_p$, each calculation block has a peripheral butterfly and $2^p-1$ internal butterflies. It can be considered that this method only comprises 3 transformation steps, the fourth step being limited to performing an addition and a subtraction. This addition and this subtraction are preferably performed during the final step, and in order to limit the number of transformation steps.

Figure 11:
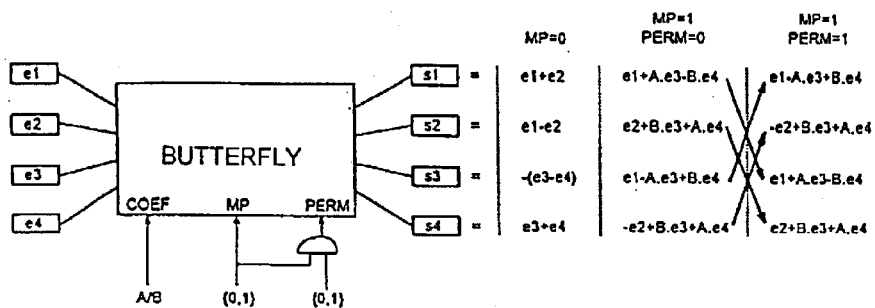
FIG. 11 represents a butterfly design relating to the transformation method illustrated in FIG. 10.

A butterfly design associated with the embodiment of FIG. 10 is represented in FIG. 11. It comprises:

four inputs for receiving input samples e1, e2, e3, e4, and four outputs for providing output samples s1, s2, s3, s4, and three additional, respectively primary mode MP, permutation PERM, and coefficient COEF, inputs.

This butterfly is responsible for selectively applying to input samples e1, e2, e3, and e4, various transformation operations each determined by the values assigned to primary mode, permutation signals and to coefficient $W^S$ admitted at the corresponding additional inputs.

The primary mode signal is 0 for a peripheral butterfly and 1 for an internal butterfly. When the permutation signal is a 1, the output samples s1 and s2 of the butterfly are swapped with output samples s3 and s4. This permutation is only possible if the butterfly is an internal one. Finally, the coefficient $W^S$ associated with the butterfly is applied to the coefficient input COEF.

Thus, if the complex coefficient $W^S=A+j.B$ is applied to the coefficient entry of the butterfly, the latter provides the following output samples s1, s2, s3, and s4

1) if the primary mode signal is 0:

$s1=e1+e2$ $s2=e1-e2$ $s3=e4-e3$ $s4=e3+e4$ 2) if the primary mode signal is 1 and the permutation signal is 0:

$s1=e1+A.e3-B.e4$ $s2=e2+B.e3+A.e4$ $s3=e1-A.e3+B.e4$ $s4=-e2+B.e3+A.e4$ 3) if the primary signal is 1 and the permutation signal is 1:

$s1=e1-A.e3+B.e4$ $s2=-e2+B.e3+A.e4$ $s3=e1+A.e3-B.e4$ $s4=e2+B.e3+A.e4$

Figure 13:
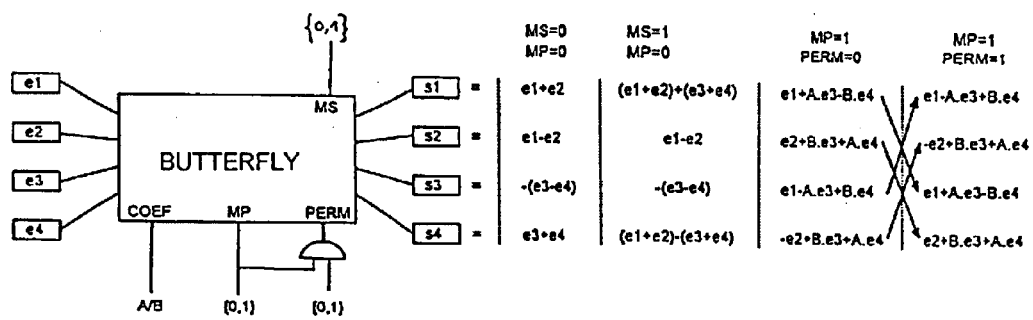
FIG. 13 represents a butterfly design relating to the embodiment of FIG. 12.
Figure 12:
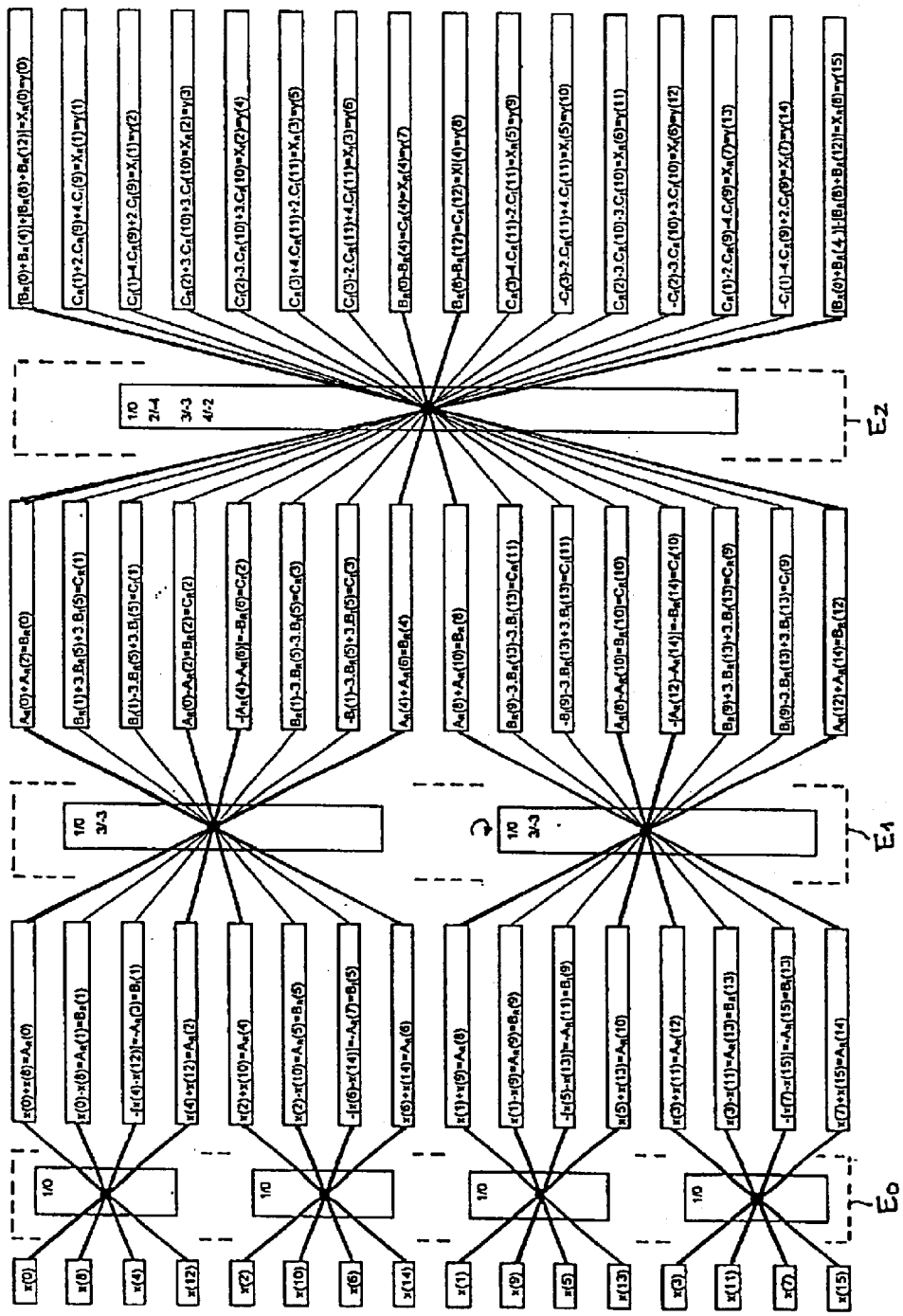
FIG. 12 represents an alternative of the embodiment of FIG. 10.

According to an alternative embodiment, provision can be made for addition and subtraction to be performed inside the peripheral butterfly of the last transformation step. This embodiment is shown in FIG. 12. For this purpose, the corresponding butterfly design has a fourth additional input called secondary mode input MS to which a secondary mode signal is applied. This signal is 1 for the peripheral butterfly of the last transformation step, otherwise it is 0. This design is illustrated in FIG. 13. This design has an additional operating mode in comparison with the preceding one; thus, when the primary mode signal is 0 and the secondary mode signal is 1, the output obtained is:

$s1=e1+e2+e3+e4$ $s2=e1-e2$ $s3=e4-e3$ $s4=(e1+e2)-(e3+e4)$

Figure 14:
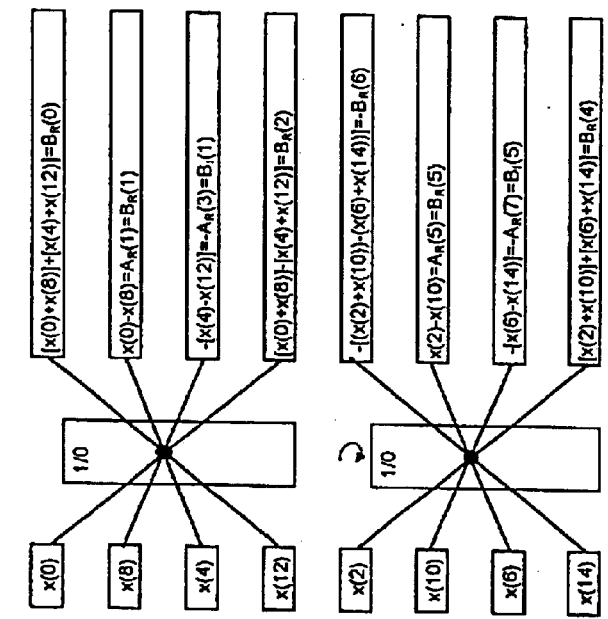
FIG. 14 illustrates a grouping of peripheral butterflies according to a second embodiment of a transformation method comprising $\mu-1$ transformation steps.
Figure 14:
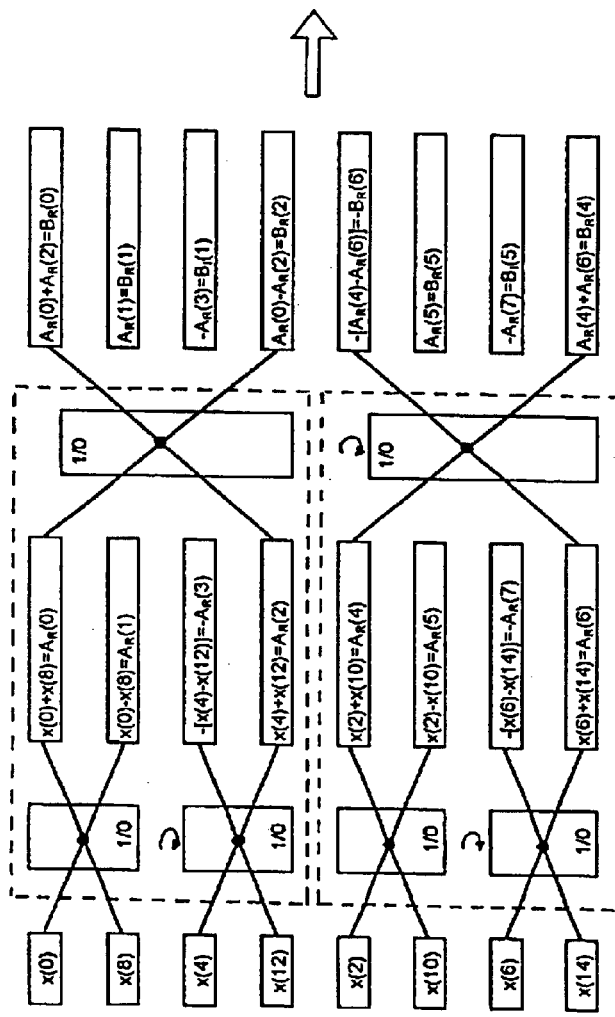
Figure 15:
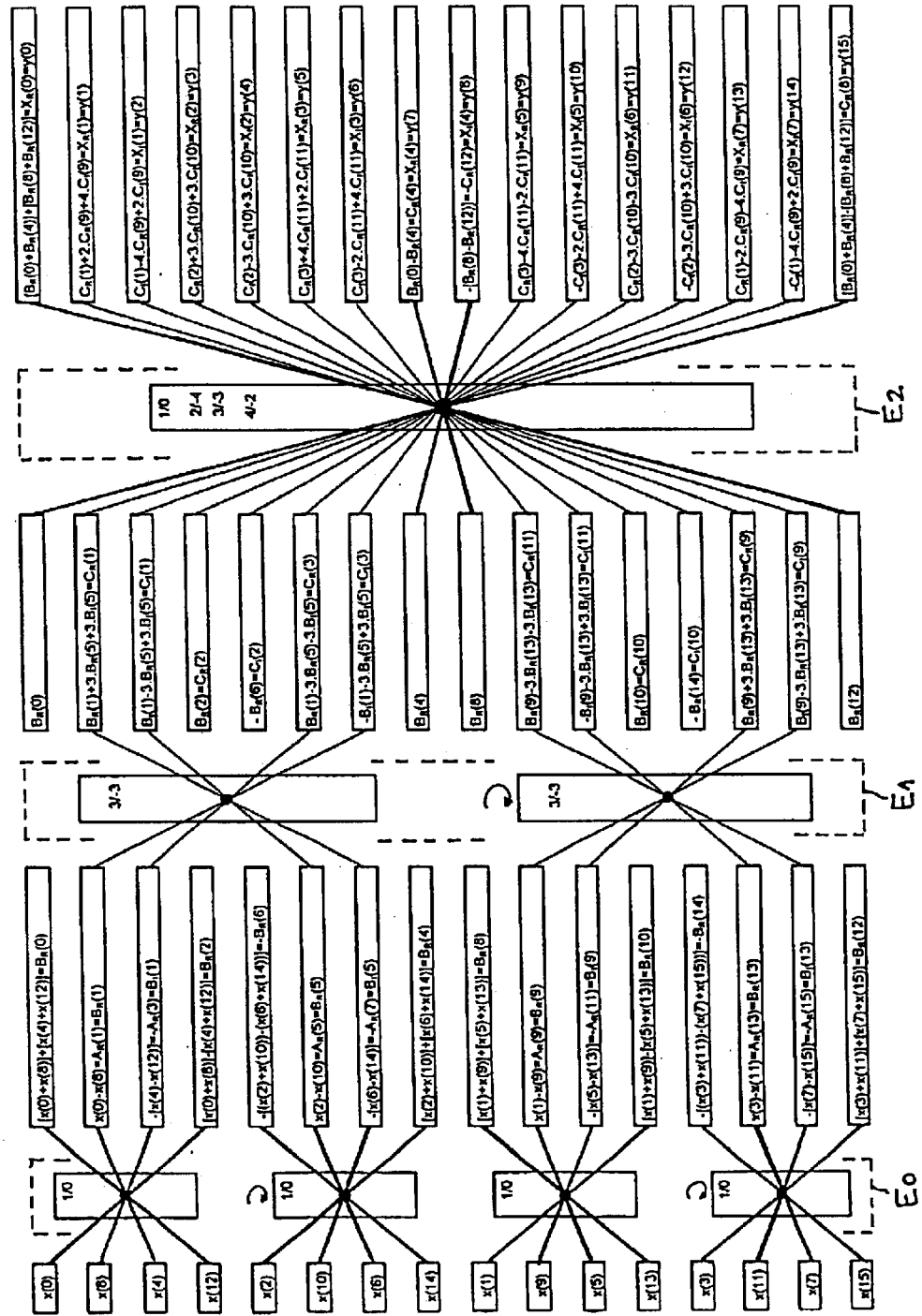
FIG. 15 represents a second embodiment of a transformation method comprising $\mu-1$ transformation steps, with $\mu$ being even.

According to a second embodiment derived from the diagram of FIG. 8, the neighboring peripheral butterflies in even index p transformation steps $E_p$ are grouped by pairs and are merged with the peripheral butterfly of the second odd index step in order to form a new peripheral butterfly at the odd index step. This grouping is illustrated in FIG. 14 in an example. In this example, the peripheral butterflies of the first transformation step processing samples x(0), x(8), x(4), and x(12) are merged with the peripheral butterfly of the second step processing samples $A_R(0)$ and $A_R(2)$. Also, the peripheral butterflies of the first transformation step processing samples x(2), x(10), x(6), and x(14) are merged with the peripheral butterfly of the second step processing samples $A_R(4)$ and $A_R(6)$. The two butterflies obtained are different in that the second one performs in addition a permutation between the first and second outputs. If this grouping is applied to the whole transformation illustrated in FIG. 8, the result is that step $E_O$ no longer uses any butterflies and can be removed. The resulting transformation method is illustrated in FIG. 15.

However, two cases should be distinguished for this transformation method: the case where N is an even power of two ($\mu$ being even) and the case where N is an odd power of two ($\mu$ being odd).

In case $\mu$ is even, there is an even number of transformation steps in the embodiment shown in FIG. 8 and grouping the peripheral butterflies of even index steps with those of the following odd index steps is no problem. This case corresponds to the diagram in FIG. 15.

Figure 16:
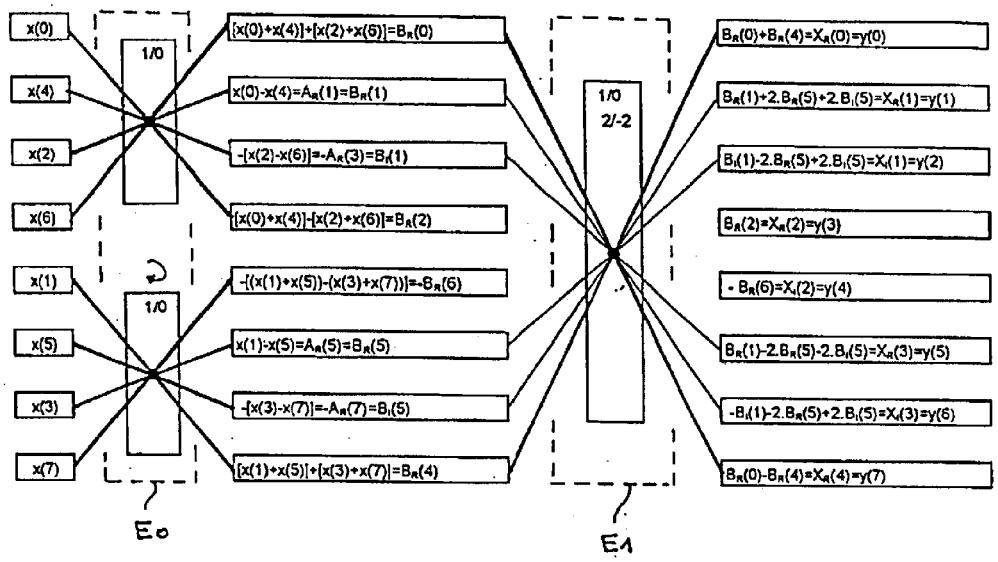
FIG. 16 represents an alternative of the preceding embodiment, with $\mu$ being odd.

In case $\mu$ is odd, the peripheral butterfly of the last even index step cannot be grouped with other peripheral butterflies. Therefore, a specific operating mode should be provided for this case. This case is illustrated in FIG. 16, this figure representing the transformation of a series of eight real samples ($\mu=3$). The peripheral butterfly of the last transformation step of this circuit could not be merged with other peripheral butterflies.

Figure 17:
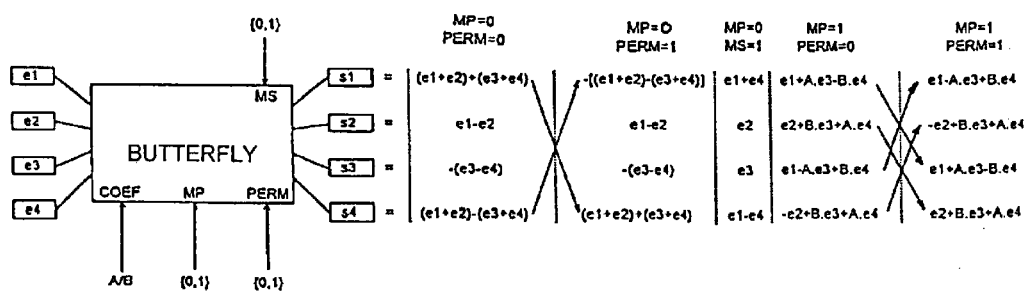
FIG. 17 represents a butterfly design relating to the embodiments shown in FIGS. 15 and 16.

The butterfly design associated with this second embodiment is illustrated in FIG. 17; it differs from the preceding design in that the secondary mode signal is 1 when a peripheral butterfly for implementing the last step is involved and $\mu$ is odd, and in that permutation applies to all the butterflies of the even rank calculation blocks.

The calculations performed by the butterfly are also different and are defined as follows:

1) if primary mode, secondary mode and permutation signals are 0:

$s1=e1+e2+e3+e4$ $s2=e1-e2$ $s3=e4-e3$ $s4=(e1+e2)-(e3+e4)$ 2) if the primary mode signal is 0 and the secondary mode signal is 1:

$s1=e1+e4$ $s2=e2$ $s3=e3$ $s4=e1-e4$ 3) if the primary mode signal is 0 and the permutation signal is 1:

$s1=(e3+e4)-(e1+e2)$ $s2=e1-e2$ $s3=e4-e3$ $s4=e1+e2+e3+e4$ 4) if the primary mode signal is 1 and the permutation signal is 0:

$s1=e1+A.e3-B.e4$ $s2=e2+B.e3+A.e4$ $s3=e1-A.e3+B.e4$ $s4=-e2+B.e3+A.e4$ 5) if the primary mode signal is 1 and the permutation signal is 1:

$s1=e1-A.e3+B.e4$ $s2=-e2+B.e3+A.e4$ $s3=e1+A.e3-B.e4$ $s4=e2+B.e3+A.e4$

Figure 18:
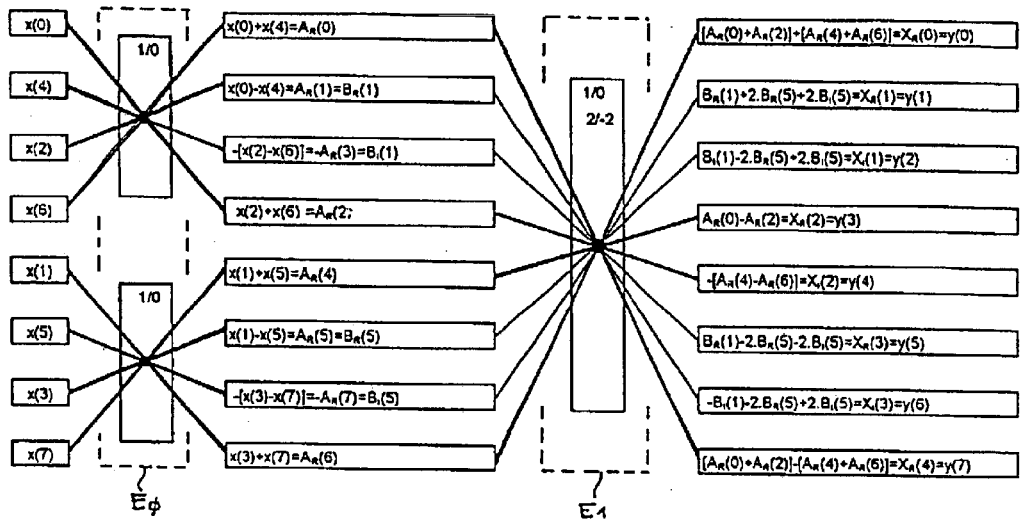
FIG. 18 represents a third embodiment of a transformation method comprising $\mu-1$ transformation steps.

In case $\mu$ is odd, it is also possible on the one hand to provide for the peripheral butterflies to be grouped for implementing the first transformation step in the same way as in the first embodiment, and on the other hand, for the butterflies of the other steps to be grouped as in the third embodiment. Grouping butterflies from the second step on is then performed by assigning an even index to the first transformation step. These groupings are represented in FIG. 18.

Figure 19:
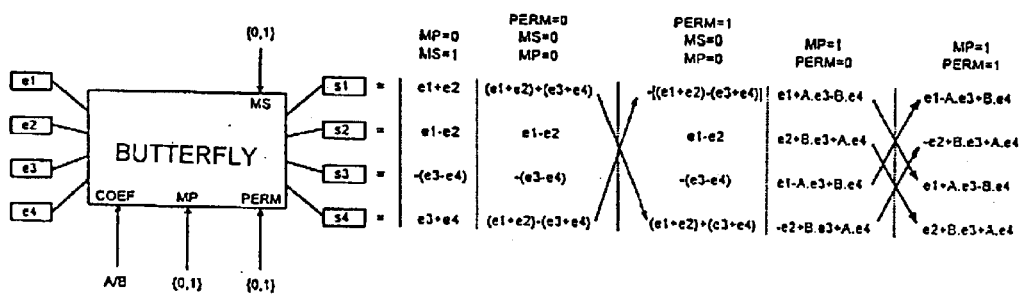
FIG. 19 represents a butterfly design relating to the embodiment of FIG. 18.

The butterfly design corresponding to this embodiment is represented in FIG. 19. The secondary mode signal is 1 for a peripheral butterfly implementing the first transformation step of the circuit and if p is even. The calculations performed by this butterfly are the following ones:

1) if the primary mode signal is 0 and the secondary mode signal is 1:

$s1=e1+e2$ $s2=e1-e2$ $s3=e4-e3$ $s4=e3+e4$ 2) if primary mode, secondary mode and permutation signals are 0:

$s1=e1+e2+e3+e4$ $s2=e1-e2$ $s3=e4-e3$ $s4=(e1+e2)-(e3+e4)$ 3) if the primary mode and secondary mode signals are 0 and the permutation signal is 1:

$s1=(e3+e4)-(e1+e2)$ $s2=e1-e2$ $s3=e4-e3$ $s4=e1+e2+e3+e4$ 4) if the primary mode signal is 1 and the permutation signal is 0:

$s1=e1+A.e3-B.e4$ $s2=e2+B.e3+A.e4$ $s3=e1-A.e3+B.e4$ $s4=-e2+B.e3+A.e4$ 5) if the primary mode signal is 1 and the permutation signal is 1:

$s1=e1-A.e3+B.e4$ $s2=-e2+B.e3+A.e4$ $s3=e1+A.e3-B.e4$ $s4=e2+B.e3+A.e4$

In all the embodiments described before, the ranks of samples processed by the same butterfly are symmetrical by pairs with respect to a center value. One just has to know the rank of the first two input samples of the butterfly to infer the other two ones therefrom by symmetry. If the input and output samples are saved in storage locations the address of which corresponds to the rank of these samples, addressing the latter will be simplified.

Indeed, all that needs to be done then is to generate two addresses per butterfly, as the other two ones can be inferred by symmetry. Furthermore, it should be noted that the addresses of the input samples and those of the corresponding output samples are the same because the transformation is applied according to an in place method.

Figure 20:
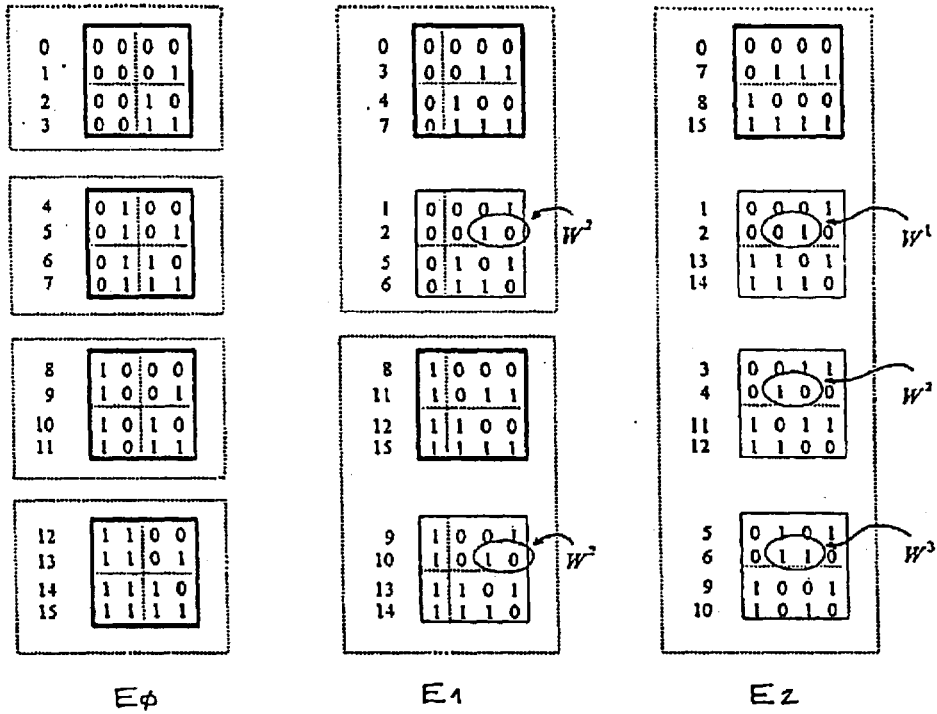
FIG. 20 represents the addresses that are associated with the various butterflies implemented in the embodiment shown in FIG. 12.

The addresses associated with the various butterflies relating to the transformation method of FIG. 12 are shown in FIG. 20. The address of a sample is taken to be equal to the rank of this sample in the sample series to which it belongs. The series to be transformed in the example of FIG. 12 comprises 16 samples. Therefore, 16 addresses have to be produced, with four-bit addressing. For a series of N samples, $\log_2(N)$-bit addressing is performed.

Each transformation step of the method of FIG. 12 is implemented by four butterflies each processing four real input samples. The binary addresses of the samples to be processed in each step are therefore distributed among four groups of four addresses. The address groups relating to one peripheral butterfly are contained in bold line boxes and the address groups relating to an internal butterfly are contained in thin line boxes. Furthermore, the address groups relating to the same calculation block are grouped in dotted line boxes.

The first peripheral butterfly in step $E_0$ processes the first four samples of the x(n) series resulting from the preliminary classification step. The corresponding addresses to be generated for this butterfly are therefore 0000, 0001, 0010, and 0011. Also, considering the first peripheral butterfly of step $E_1$, it processes the samples of rank 0, 3, 4, and 7 of the A(n) series. The corresponding addresses to be generated for this butterfly are therefore 0000, 0011, 0100, and 0111.

The ($\mu$–2–p) high-order bits of the addresses indicate rank q of the calculation block to which the address is related. Thus, the two high-order bits of the addresses generated for the first calculation block of step $E_0$ are 00. It should also be noted that, as the last step only uses a single calculation block, the addresses generated for this calculation block have no bit relating to the rank of this block ($\mu$–p–2=0).

For each butterfly, provision is made for generating only two binary addresses; the other two ones are obtained by inverting the (p+2) low-order bits of the generated addresses. E.g., considering the addresses of the first peripheral butterfly in step $E_1$, only addresses 0000 and 0011 are generated and addresses 0111 and 0100 are obtained by inverting the 3 low-order bits of the generated addresses.

A first and a second address per butterfly are then produced, these addresses being consecutive for an internal butterfly. When a peripheral butterfly is involved, the p+2 low-order bits of the first address are equal to 0, and the p+2 low-order bits of the second address form a number equal to $2^{p+1}-1$.

Regarding the coefficients $W^S$ to be applied to the coefficient inputs COEF of the internal butterflies, they are stored in a memory of the calculation circuit. Only N/4 coefficient values are required for calculating the Fourier transform. $\mu$–2-bit addressing is performed for these coefficients. In the embodiments described previously where N=16, only the pairs 1/0, 2/–4, 3/–3, and 4/–2 are used which correspond to coefficients $W^0$, $W^1$, $W^2_1$ $W^3$.

According to the invention, the address of these four coefficients must therefore be known. The address associated with each coefficient $W^S$ is chosen to be equal to the value of the power s. Consequently, the addresses of coefficients $W^0$, $W^1$; $W^2_1$ $W^3$ are 00, 01, 10, 11, respectively.

So as not to be obliged to generate these addresses, according to the invention, the addresses produced for addressing the samples are used. The address of the coefficient which is assigned to a butterfly is included in the second address produced corresponding to the greater one of both addresses.

Figure 21:
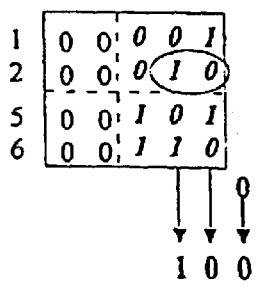
FIG. 21 represents the addresses that are associated with part of the samples of a transformation method processing a series of 32 real samples.

However, we must distinguish between three cases:

a) when p+1=$\mu$–2, the coefficient address corresponds to the number formed by the p+1 low-order bits of the second address generated for this internal butterfly. This is the case for the second step (p=1) in the example of FIG. 20. The 2 low-order bits of the second address are 10 and therefore designate coefficient $W^2$.

b) if p+1>$\mu$–2, the coefficient address corresponds to the number formed by the p+1 low-order bits of the second address generated for this internal butterfly, minus its $\mu$–p–1 low-order bits. This is the case for the third step (p=2) in the example of FIG. 20. The 3 low-order bits of the second address generated for the first internal butterfly are 010. When the last bit ($\mu$–p–1=1) of this number is taken away, the number 01 is obtained relating to coefficient $W^1$. This case always corresponds to the last step of a transformation method comprising $\mu$–1 transformation steps.

c) if p+1<$\mu$–2, the coefficient address corresponds to the number formed by the p+1 low-order bits of the second address generated for this internal butterfly, followed by $\mu$–p–3 zero bits at the end of the number. This case is illustrated in FIG. 21. This figure represents the addresses relating to an internal butterfly for implementing the second transformation step (p=1) of a transformation method designed for processing a series of 32 real samples (N=32 and $\mu$=5). This butterfly transforms the samples of rank 1, 2, 5, and 6 of the series of samples obtained at the end of the first step. The two low-order bits of the second generated address are 10 and if a zero ($\mu$–p–3=1) is added at the end of the number, the number 100 is obtained designating coefficient $W^4$.

Thus, both addresses produced by the address generator for one butterfly is used to address both four samples to be processed and the coefficient relating to the butterfly.

Preferably, even address and odd address samples will be stored in two separate memories. Thus, it will be possible to read two input samples simultaneously, and it will be possible to write the resulting output samples simultaneously, which means saving process time for the series to be transformed.

As mentioned before, for each calculation method operating according to a time interleaving algorithm there is a corresponding method operating according to a frequency interleaving algorithm. All that has to be done to obtain it is, on the one hand, to invert the series of transformation operations of the corresponding time interleaving method, and on the other hand, for each butterfly, to invert the transformation operations themselves with respect to those of the corresponding method.

In addition, the invention also relates to a method of calculating the fast Fourier transform or the inverse fast Fourier transform of a series of N complex samples X(n) conjugated by pairs, with N power of 2, operating according to a frequency interleaving algorithm. The series of N complex samples X(n) is represented by a series of N real samples y(n) defined as follows:

| | |
|---|---|
| y(0) = Re[X(0)] | |
| y(n) = Re[(X((n + 1)/2)] | for n being odd and different from N – 1 |
| y(n) = Im[X(n/2)] | for n being even and different from 0 |
| y(N – 1) = Re[X(N/2)] | |

According to the invention, this method substantially comprises transformation steps for transforming input samples into output samples. Real samples y(n) are processed in a first transformation step and the last step provides a series of N output samples x(n) representative of the fast or the inverse fast Fourier transform of the sample series X(n). As for the time interleaving circuits, each transformation step is implemented by a set of butterflies with several inputs and several outputs. As the transformation is done according to an in place method, all the steps are performed by means of a single set of butterflies, the operating mode of which is modified in each transformation step. In each transformation step, input and output samples are stored in a storage memory. When they have been transformed, the output samples of the same butterfly replace the corresponding input samples of the same rank in the storage memory.

According to the invention, if the samples y(n) introduced in the first transformation step are classified in ascending order of index n, the output samples x(n) are provided in the last transformation step in bit-reversed order of index n. The output sequence of the x(n) samples can then be modified by a final step so as to classify them in ascending order of index n.

Figure 22:
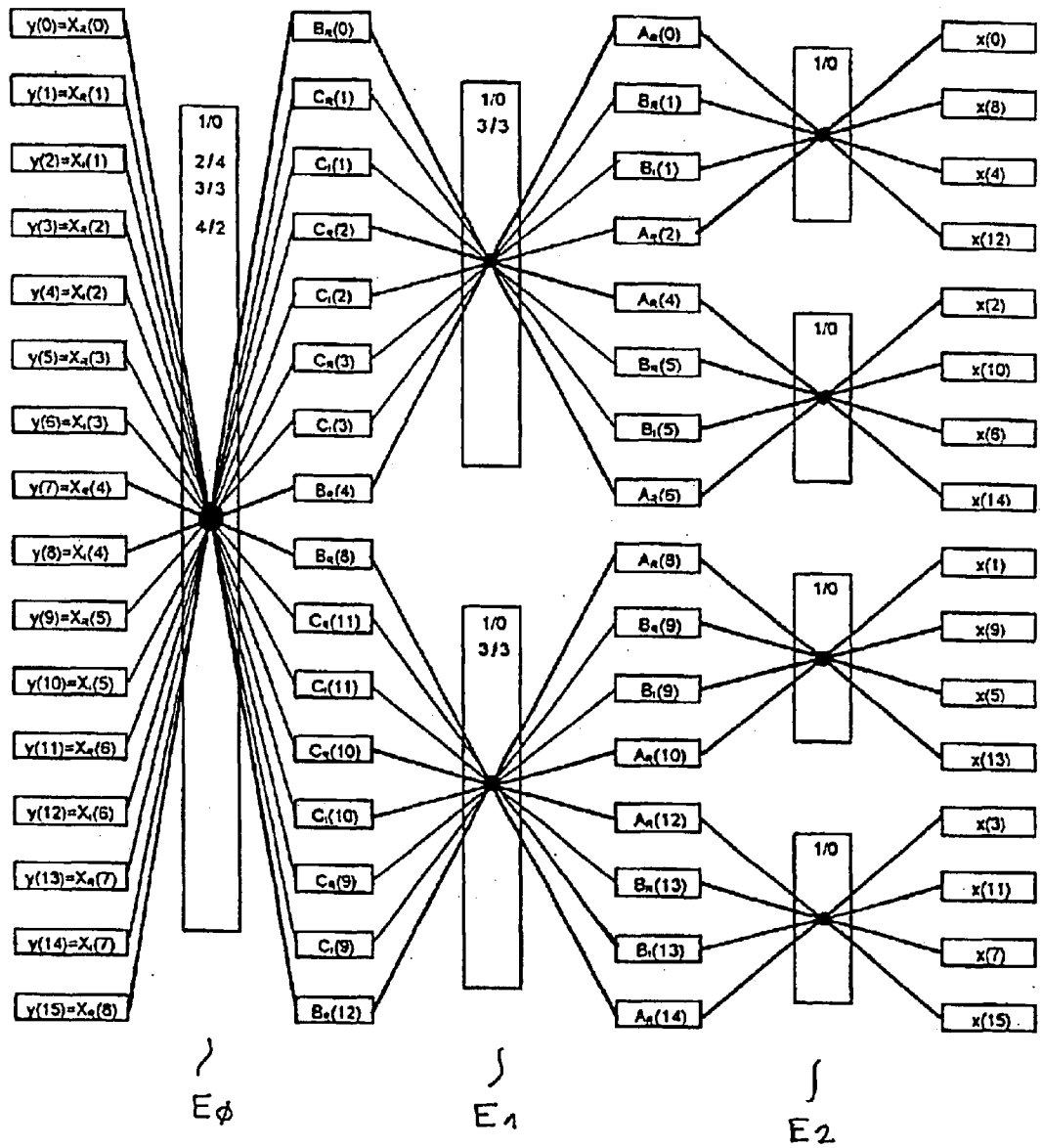
FIG. 22 represents a sample embodiment of a transformation method operating according to a frequency interleaving algorithm.

An embodiment of such a transformation is represented in FIG. 22. It is inferred from the embodiment of FIG. 12 by inverting the functional arrangement of the transformation steps of FIG. 12 (mirror image of what it is for time interleaving). This embodiment allows the calculation of the inverse fast Fourier transform of a series of 16 real samples y(n) representative of a series of 16 complex samples X(n) conjugated by pairs. Coefficients $W^S$ are therefore of the type $e^{j(2\pi s/N)}$.

This embodiment comprises three transformation steps $E_p$ with $0 \leq p \leq 2$. In each transformation step $E_p$, the butterflies are henceforth distributed among $2^p$ calculation blocks, these calculation blocks being sorted in each step according to an ascending rank q from 0 to $2^p-1$. Each calculation block has a peripheral butterfly and $N/2^{+2}-1$ internal butterflies. The y(n) samples are applied in the sequence of index n in the first step.

The ranks of the samples processed by the same butterfly are defined as follows: in step $E_\beta$, considering a peripheral butterfly belonging to the rank $\alpha$ calculation block, it transforms the input samples of rank $2^{\mu-\beta}\alpha$, $2^{\mu-\beta}\alpha+2^{\mu-\beta-1}-1$, $2^{\mu-\beta}\alpha+2^{\mu-\beta-1}$, $2^{\mu-\beta}\alpha+2^{\mu-\beta}-1$ into output samples of the same rank, and, in step $E_\beta$, considering an internal rank $\tau$ butterfly in the rank $\alpha$ calculation block, it transforms the input samples of rank $2^{\mu-\beta}\alpha+2\tau+1$, $2^{\mu-\beta}\alpha+2\tau+2$, $2^{\mu-\beta}\alpha+2^{\mu-\beta}-2\tau-3$, $2^{\mu-\beta}\alpha+2^{\mu-\beta}-2\tau-2$ into output samples of the same rank. Finally, the coefficient assigned to the rank $\tau$ internal butterfly of the rank a calculation block in step $E_\beta$ is equal to $W^\delta$ with $\delta=(\tau+1).2^\beta$.

The real samples x(n) obtained at the end of the method are provided in bit-reversed order of index n.

Figure 23:
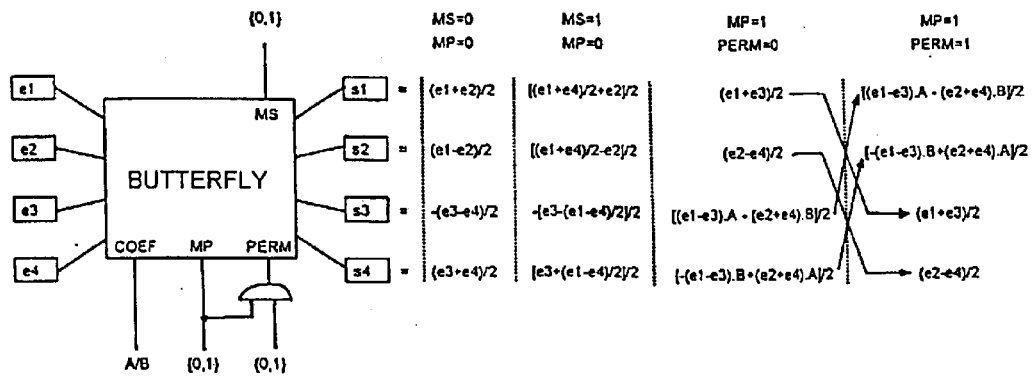
FIG. 23 represents a butterfly design relating to the embodiment of FIG. 22.

At the butterflies, the coefficients $W^S$ are of the type $e^{j(2\pi s/N)}$ and inputs and outputs have been inverted with respect to the embodiment of FIG. 12. Consequently, the operations performed by the butterflies of this embodiment are different from those performed by the butterflies of FIG. 12. A butterfly design associated with the embodiment of FIG. 22 is represented in FIG. 23.

Just like the design associated with FIG. 12, it has four data inputs and four data outputs as well as four additional inputs, respectively primary mode MP, secondary mode MS, permutation PERM, and coefficient COEF inputs. The primary mode signal is 0 for an peripheral butterfly and 1 for an internal butterfly. The permutation signal is 0 for even values of rank q and 1 for odd values. Finally, the secondary mode signal is 1 if the peripheral butterfly is used for implementing the first step, and otherwise 0.

The calculations performed by this butterfly are the following ones ($W^S=A+j.B$):

1) if the primary mode and secondary mode signals are 0:

$s1=(e1+e2)/2$ $s2=(e1-e2)/2$ $s3=(e4-e3)/2$ $s4=(e3+e4)/2$ 2) if the primary mode signal is 0 and the secondary mode signal is 1:

$s1=[(e1+e4)/2+e2]/2$ $s2=[(e1+e4)/2-e2]/2$ $s3=-[e3-(e1-e4)/2]/2$ $s4=[e3+(e1-e4)/2]/2$ 3) if the primary mode signal is 1 and the permutation signal is 0:

$s1=(e1+e3)/2$ $s2=(e2-e4)/2$ $s3=[(e1-e3).A-(e2+e4).B]/2$ $s4=[-(e1e3).B+(e2+e4).A]/2$ 4) if the primary mode signal is 1 and the permutation signal is 1:

$s1=[(e1-e3).A-(e2+e4).B]/2$ $s2=[-(e1-e3).B+(e2+e4).A]/2$ $s3=(e1+e3)/2$ $s4=(e2-e4)/2$

This design is inferred from the design of FIG. 13 by inverting values e1, e2, e3, e4 and values s1, s2, s3, s4, and by replacing B with -B because coefficient $W^S$ is now of the type $e^{j(2\pi/N)}$. As A and B represent the cosine and sine of the same number, they have become $A^2+B^2=1$. The expressions of s1, s2, s3, s4 are thus simplified.

According to the invention, addresses are furthermore generated for sample addressing. Provision is made for generating two binary addresses of $\mu$ bits per butterfly, each binary address corresponding to the rank of a butterfly input sample. The addresses of the other two samples to be applied to the butterfly inputs are obtained by inverting the $\mu$-p low-order bits of the first two addresses.

Figure 24:
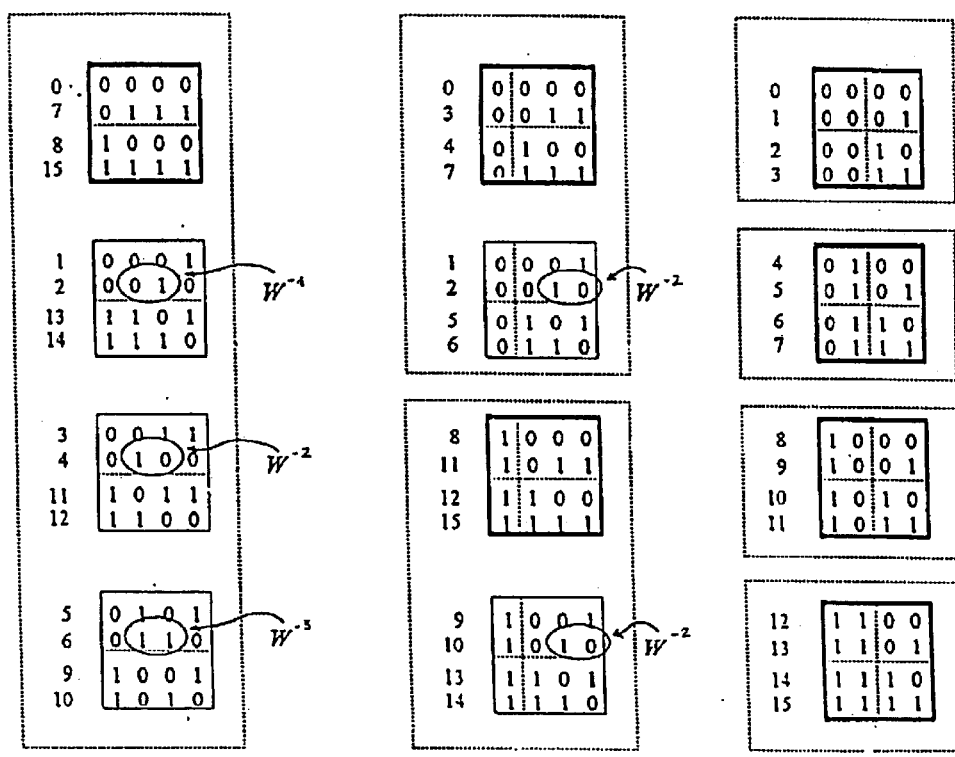
FIG. 24 represents the addresses that are associated with the various butterflies of the embodiment illustrated in FIG. 22.

In the same way as for the transformation methods operating according to time interleaving, the two binary addresses produced are consecutive for an internal butterfly. For a peripheral butterfly, the $\mu$-p low-order bits of the first generated address are equal to 0, and the $\mu$-p low-order bits of the second address form a number equal to $N/2^{p+1}-1$. By way of example, the addresses produced for the transformation circuit of FIG. 22 are gathered in FIG. 24.

Advantageously, provision can be made for storing even address samples and odd address samples in two separate memories in order to reduce processing time of the transformation operation.

Finally, the addresses generated for addressing the samples are also used for addressing coefficients $W^S$. The value of the parameter s is used for addressing the corresponding coefficient $W^S$. In this embodiment, the parameter s is equal to:

if $\mu-p-1=\mu-2$, the number formed by the $\mu-p-1$ low-order bits of the second address produced for said internal butterfly, if $\mu-p-1<\mu-2$, the number formed by the $\mu-p-1$ low-order bits of the second address produced for said internal butterfly, followed by p-1 zero bits at the end of the number, if $\mu-p-1>\mu-2$, the number formed by the $\mu-p-1$ low-order bits of the second address produced for said internal butterfly, minus its p+1 low-order bits. This case corresponds to the first step (p=0) of the transformation methods operating according to a frequency interleaving algorithm.

What is claimed is:

1. A method of calculating a fast Fourier transform or an inverse fast Fourier transform of a digital signal defined by a series of N real starting samples x(n), with N a power of two and n ∈ [0 . . . N−1], the method comprising the steps of:

transforming input samples into output samples in a first transformation step;

transforming input samples into output samples in at least one successive transformation step to the first transformation step; and storing the input samples and output samples of each transformation step in a storage memory;

wherein each of the transformation steps is performed by means of a single set of butterfly circuits with several inputs and several outputs, the operating mode of the set of butterfly circuits modified selectively in each transformation step, a series of N output samples y(n) representative of the fast Fourier transform or the inverse fast Fourier transform of the output samples x(n) being provided in a last transformation step;

wherein output samples y(n) are real;

wherein output samples of a butterfly circuit replace the corresponding input samples of the same rank in the storage memory, so that, if the starting samples x(n) processed in the first transformation step are classified in bit-reversed order of their index n, output samples y(n) are provided in the last transformation step in ascending order of index n and are defined by the following relations:

$y(0)=Re[X(0)]$, $y(n)=Re[X((n+1)/2]$ for n being odd and different from N−1, $y(n)=Im[X(n/2)]$ for n being even and different from 0, and $y(N−1)=Re[X(N/2)]$; and wherein samples X (n), with n ∈ [0 . . . N−1], designate complex samples of the series corresponding to the fast or inverse fast Fourier transform of the starting samples series x(n).

2. The calculation method according to claim 1, wherein, in each transformation step, each butterfly circuit transforms input sample pairs, the ranks of the input samples of the same pair within the series of input samples of said transformation step being symmetrical with respect to a center between the end rank values of the input samples transformed by said butterfly circuit.

3. The calculation method according to claim 2, further comprising the step of:

transforming input samples into output samples in $\mu-1$ transformation steps $E_p$ wherein $\mu=\log_2(N)$ and p ∈ [0 . . . $\mu-2$].

4. The calculation method according to claim 3, further comprising:

a preliminary step of modifying the sequence of the starting samples x(n) ranked in ascending order of index n and showing the starting samples in bit-reversed order of index n in the first transformation step, and a final step of processing the series of output samples y(n) and providing a series of N complex conjugated samples X(n) corresponding to the fast or the inverse fast Fourier transform of the series of starting samples x(n).

5. The calculation method of claim 3, wherein in each transformation step $E_p$, butterfly circuits are distributed among $N/2^{p+2}$ calculation blocks, wherein each calculation block has a peripheral butterfly circuit and/or $2^p-1$ internal butterfly circuits, wherein the peripheral butterfly circuit of a rank α calculation block in transformation step Eβ transforms the input samples of rank $2^{\beta+2}\alpha$, $2^{\beta+2}\alpha+2^{\beta+1}-1$, $2^{\beta+2}\alpha+2^{\beta+}$, $2^{\beta+2}\alpha+2^{\beta+}-1$ into output samples of the same rank, and wherein an internal rank τ butterfly circuit of the rank α calculation block in transformation step Eβ transforms the input samples of rank $2^{\beta+2}\alpha+2\tau+1$, $2^{\beta+2}\alpha+2\tau+2$, $2^{\beta+2}\alpha+2^{\beta+2}-2\tau-3$, $2^{\beta+2}\alpha+2^{\beta+2}-2\tau-2$ into output samples of the same rank, with $\beta \geq 1$.

6. The calculation method according to claim 5, wherein each butterfly circuit is assigned a coefficient $W^S$, whereon the calculation inside the butterfly circuit is based, wherein said coefficient is equal to $e^{-(2\pi s/N)}$ with S ∈ [0 . . . N/4−1] for a fast Fourier transform, and wherein said coefficient is equal to $e^{j(2\pi s/N)}$ with s ∈ [0 . . . N/4−1] for an inverse fast Fourier transform.

7. The calculation method according to claim 6, wherein the internal rank τ butterfly circuit of the rank α calculation block in transformation step Eβ is assigned coefficient $W^\delta$ with $\delta=(\tau+1)\cdot(N/2^{\beta+2})$.

8. The calculation method according to claim 7, wherein the butterfly circuits for implementing the transformation steps are all of the same type and comprise:

four inputs for receiving input samples and four outputs for providing output samples, and four additional inputs, respectively primary mode, secondary mode, permutation, and coefficient inputs, to selectively apply different transformation operations to the input samples, each operation being determined by the values assigned to the primary mode, secondary mode, permutation signals, and a coefficient admitted on said corresponding additional inputs, and wherein the final step furthermore performs an addition and subtraction between the first and the last output sample provided in the last transformation step.

9. The calculation method according to claim 8, wherein, in transformation step $E_p$, each calculation block comprises one peripheral butterfly circuit and $2^p-1$ internal butterfly circuits.

10. The calculation method according to claim 9, wherein, for four input samples e1, e2, e3, and e4, and for a complex coefficient $W^S-A+j\cdot B$, the butterfly circuit delivers the following output samples s1, s2, s3, and s4:

1) if the primary mode signal is 0:

$s1=e1+e2$, $s2=e1-e2$, $s3=e4-e3$, and $s4=e3+e4$;

2) if the primary mode signal is 1 and the permutation signal is 0:

$s1=e1+A.e3-B.e4$, $s2=e2+B.e3+A.e4$, $s3=e1-A.e3+B.e4$, and $s4=-e2+B.e3+A.e4$;

3) if the primary signal is 1 and the permutation signal is 1:

$s1=e1-A.e3+B.e4$, $s2=-e2+B.e3+A.e4$, $s3=e1+A.e3-B.e4$, and $s4=e2+B.e3+A.e4$.

11. The calculation method according to claim 7, wherein the butterfly circuits for implementing the transformation steps are all of the same type and comprise:

four inputs for receiving input samples and four outputs for providing output samples, and four additional inputs, respectively primary mode, secondary mode, permutation, and coefficient inputs, to selectively apply different transformation operations to the input samples, each operation being determined by the values assigned to the primary mode, secondary mode, permutation signals, and a coefficient admitted on said corresponding additional inputs.

12. The calculation method according to claim 11, wherein the first and second binary addresses of $\mu$ bits are generated for each butterfly circuit, each binary address corresponding to the rank of an input sample of said butterfly circuit and the second binary address being greater than the first binary address.

13. The calculation method according to claim 12, wherein, if a peripheral butterfly circuit is involved, the p+2 low-order bits of the first address are equal to 0, and the p+2 low-order bits of the second address form a number equal to $2^{p+1}-1$.

14. The calculation method according to claim 13, wherein the value of the parameter s of the coefficient $W^S$ assigned to an internal butterfly circuit in transformation step $E_p$ is coded by $\mu-2$ bits, and is:

if $p+1=\mu-2$, the number formed by the p+1 low-order bits of the second binary address produced for said internal butterfly circuit;

if $p+1<\mu-2$, the number formed by the p+1 low-order bits of the second binary address produced for said internal butterfly circuit, followed by $\mu-p-3$ zero bits at the end of the number; and if $p+1>\mu-2$, the number formed by the p+1 low-order bits of the second binary address produced for said internal butterfly circuit, minus the $\mu-p-1$ low-order bits of the second binary address.

15. The calculation method according to claim 12, wherein said first and second binary addresses are consecutive and an internal butterfly circuit is involved.

16. The calculation method according to claim 15, wherein the addresses of two other samples to be applied to the inputs of the butterfly circuit, whether peripheral or internal, are obtained by inverting the (p+2) low-order bits of said first and second produced addresses.

17. The calculation method according to claim 16, wherein even-numbered address samples and odd-numbered address samples are stored in two separate memories.

18. The calculation method according to claim 11, wherein, for each butterfly circuit, the primary mode signal is 0 for a peripheral butterfly circuit and 1 for an internal butterfly circuit, and wherein the permutation signal is 0 for the even rank calculation blocks, including rank 0, and 1 for the other calculation blocks.

19. The calculation method according to claim 18, wherein, in transformation step $E_p$, each calculation block comprises:

$2^P-1$ internal butterfly circuits butterflies and a peripheral butterfly circuit for the even values of index p as well as for the last transformation step if $\mu$ is even, and $2^P-1$ internal butterfly circuits, otherwise.

20. The calculation method according to claim 18, wherein, in transformation step $E_p$, each calculation block comprises:

$2^P-1$ internal butterfly circuits and a peripheral butterfly circuit for the even values of index p, and $2^P-1$ internal butterfly circuits, otherwise.

21. The calculation method according to claim 20, wherein the secondary mode signal is 1 if the peripheral butterfly circuit is used for the first transformation step with $\mu$ being even, and otherwise 0.

22. The calculation method according to claim 21, wherein, for four input samples e1, e2, e3, and e4, and for a complex coefficient $W^S=A+j.B$, the butterfly circuit delivers the following output samples s1, s2, s3, and s4:

1) if the primary mode signal is 0 and the secondary mode signal is 1:

$s1=e1+e2$, $s2=e1-e2$, $3=34-e3$, and $4=e3+e4$;

2) if primary mode, secondary mode and permutation signals are 0:

$s1=e1+e2+e3+e4$, $s2=e1-e2$, $s3=e4-e3$, and $s4=(e1+e2)-(e3+e4)$;

3) the primary mode and secondary mode signals the permutation signal is 1:

$s1=(e3+e4)-(e1+e2)$, $s2=e1-e2$, $s3=e4-e3$, and $s4=e1+e2+e3+e4$;

4) if the primary mode permutation signal is 1 and the permutation signal is 0:

$s1=e1+A.e3-B.e4$, $s2=e2+B.e3+A.e4$, $s3=e1-A.e3+B.e4$, and $s4=-e2+B.e3+A.e4$;

5) if the primary mode signal is I and the permutation signal is 1:

$s1=e1-A.e3+B.e4$, $s2=-e2+B.e3+A.e4$, $s3=e1+A.e3-B.e4$, and $s4=e2+B.e3+A.e4$.

23. The calculation method according to claim 18, wherein, in transformation step Ep, each calculation block comprises one peripheral butterfly circuit and $2^P-1$ internal butterfly circuits.

24. The calculation method according to claim 23, wherein the secondary mode signal is 1 if the peripheral butterfly circuit is used for the last transformation step, and otherwise 0.

25. The calculation method according to claim 24, wherein, for four input samples e1, e2, e3, and e4, and for a complex coefficient $W^S = A + j.B$, the butterfly circuit delivers the following output samples s1, s2, s3, and s4:

1) if the primary mode and secondary mode signals are 0:

$s1=e1+e2$, $s2=e1-e2$, $s3=e4-e3$, and $s4=e3+e4$;

2) if the primary mode signal is 0 and the secondary mode signal is 1:

$s1=e1+e2+e3+e4$, $s2=e1-e2$, $s3=e4-e3$, and $s4=(e1+e2)-(e3+e4)$;

3) if the primary mode signal is 1 and the permutation signal is 0:

$s1=e1+A.e3-B.e4$, $s2=e2+B.e3+A.e4$, $s3=e1-A.e3+B.e4$, and $s4=e2+B.e3+A\ e4$; and 4) if the primary mode signal is 1 and the permutation signal is 1:

$s1=e1-A.e3+B.e4$, $s2=-e2+B.e3+A.e4$, $s3=e1-A.e3-B.e4$, and $s4=e2+B.e3+A.e4$.

26. The calculation method according to claim 26, wherein the secondary mode signal is 1 if the peripheral butterfly circuit is used for the last transformation step with $\mu$ being odd, and otherwise 0.

27. The calculation method according to claim 26, wherein, for four input samples e1, e2, e3, and e4, and for a complex coefficient $W^S = A + j.B$, the butterfly circuit delivers the following output samples s1, s2, s3, and s4:

1) if primary mode, secondary mode and permutation signals are 0:

$s1=e1+e2+e3+e4$, $s2=e1-e2$, $s3=e4-e3$, and $s4=(e1+e2)-(e3+e4)$;

2) if the primary mode signal is 0 and the secondary mode signal is 1:

$s1=e1+e4$, $s2=e2$, $s3=e3$, and $s4=e1-e4$;

3) if the primary mode signal is 0 and the permutation signal is 1:

$s1=(e3+e4)-(e1+e2)$, $s2=e1-e2$, $s3=e4-e3$, and $s4=e1+e2+e3+e4$;

4) if the primary mode signal is 1 and the permutation signal is 0:

$s2=e1+A.e3-B.e4$, $s2=e2+B.e3+A.e4$, $s3=e1-A.e3+B.e4$, and $s4=e2+B.e3+A.e4$; and 5) if the primary mode signal is 1 and the permutation signal is 1:

$s1=e1-A.e3+B.e4$, $s2=e2+B.e3+A.e4$, $s3=e1+A.e3-B.e4$, and $s4=e2+B.e3+A.e4$.

28. A method of calculating a fast Fourier transform or an inverse fast Fourier transform of a digital signal defined by a series of N complex samples X(n) conjugated by pairs, characterized in that the calculation is done on a series of N real starting samples y(n) representative of the series of complex samples X(n), with N power of two and n c [0 . . . N–1], the starting samples y(n) being defined as follows:

$y(0)=Re[X(0)]$, $y(n)=Re[X((n+1)/2)]$ for n being odd and different from N–1.

$y(n)=Im[X(n/2)]$ for n being even and different from 0, and $y(N-1)=Re[X(N/2)]$;

the method comprising the steps of:

transforming input samples into output samples in a first transformation step;

transforming input samples into output samples in at least one successive transformation step; and storing the input samples and output samples of each transformation step in a storage memory;

wherein a series of N real output samples x(n) representative of the fast or inverse fast Fourier transform is provided in a last transformation step, all of the transformation steps being performed by means of a single set of butterfly circuits with several inputs and several outputs, the operating mode of the set of butterfly circuits modified selectively in each successive transformation step;

and wherein the output samples of a butterfly circuit replace the corresponding input samples of the same rank in the storage memory, so that, if the starting samples y(n) processed in the first transformation step are classified in ascending order of index n, the output samples x(n) are provided in the last transformation step in bit-reversed order of index n.

29. The calculation method according to claim 28, wherein, in each transformation step, each butterfly circuit transforms input sample pairs, the ranks of the input samples of the same pair within the series of input samples of said transformation step being symmetrical with respect to a center between the end rank values of the input samples transformed by said butterfly circuit.

30. The calculating method according to claim 29, further comprising the step of:

transforming input samples into output samples in $\mu$–1 transformation steps $E_p$, wherein $\mu=\log_2 (N)$ and $p \in [0 \ldots \mu-2]$.

31. The calculation method according to claim 30, wherein in each transformation step $E_p$, the butterfly circuits are distributed among $2^p$ calculation blocks, wherein each calculation block comprises one peripheral butterfly circuit and $N/2^{p+2}-1$ internal butterfly circuits, and wherein the peripheral butterfly circuit of the rank $\alpha$ calculation block in transformation step $E_\beta$ transforms the input samples of rank $2^{\mu-\beta}\alpha$, $2^{\mu-\beta}\alpha+2^{\mu-\beta-1}-1$, $2^{\mu-\beta}\alpha+2^{\mu-\beta-1}, 2^{\mu-\beta}\alpha+2^{\mu-\beta}-1$ into output samples of the same rank, and wherein the internal rank $\tau$ butterfly circuit of the rank $\alpha$ calculation block in transformation step $E_\beta$ transforms the input samples of rank $2^{\mu-\beta}\alpha+2\tau+1$, $2^{\mu-\beta}\alpha+2\tau+2$, $2^{\mu-\beta}\alpha+2 2^{\mu-\beta-1}-2\tau-3$, $2^{\mu-\beta}\alpha+2 2^{\mu-\beta-1}-2\tau-2$ into output samples of the same rank.

32. The calculation method according to claim 31, further comprising a final step of modifying the sequence of the output samples provided in the last transformation step and classifying the output samples in ascending order of index n.

33. The calculation method according to claim 31, wherein each butterfly circuit is assigned a coefficient $W^S$, whereon the calculation inside the butterfly is based, said coefficient equal to $e^{-j(2\pi s/N)}$ with $s \in [0 \ldots N/4-1]$ for a fast Fourier transform, and said coefficient equal to $e^{j(2\pi s/N)}$ with $s \in [0 \ldots N/4-1]$ for an inverse fast Fourier transform.

34. The calculation method according to claim 33, wherein the internal rank $\tau$ butterfly circuit of the rank $\alpha$ calculation block in transformation step $E_\beta$ is assigned coefficient $W^\delta$ with $\delta=(\tau+1) \cdot 2^\beta$.

35. The calculation method according to claim 34, wherein the butterfly circuits for implementing the transformation steps are all of the same type and comprise:

four inputs for receiving input samples and four outputs for providing output samples, and four additional inputs, respectively primary mode, secondary mode, permutation, and coefficient inputs, in order to selectively apply different transformation operations to the input samples, each operation being determined by the values assigned to the primary mode, secondary mode, permutation signals, and a coefficient admitted on said corresponding additional inputs.

36. The calculation method according to claim 35, wherein, for each butterfly circuit, the primary mode signal is 0 for a peripheral butterfly circuit and 1 for an internal butterfly circuit, in that the permutation signal is 0 for the even rank calculation blocks, including rank 0, and 1 for the odd values.

37. The calculation method according to claim 33, wherein characterized in that the secondary mode signal is 1 if the butterfly circuit, whether peripheral or internal, is used for the first transformation step, and otherwise 0.

38. The calculation method according to claim 37, wherein, for four input samples e1, e2, e3, and e4, and for a complex coefficient $W^S=A+j.B$, the butterfly circuit delivers the following output samples s1, s2, s3, and s4:

1) if the primary mode and secondary mode signals are 0:

$s1=(e1+e2)/2$, $s2=(e1-e2)/2$, $s3=(e4-e3)/2$, and $s4=(e3+e4)/2$;

2) if the primary mode signal is 0 and the secondary mode signal is 1:

$s1=[(e1+e4)/2-e2]/2$, $s2=[e1+e4)/2-e2]/2$, $s3=[e3-(e1-e4)/2]/2$, and $s4=[e3+(e1+e4)/2]/2$;

3) if the primary mode signal is 1 and the permutation signal is 0:

$s1=(e1+e3)/2$, $s2=(e2+e4)/2$, $s3=[(e1-e3).A-(e2+e4).B]/2$, and $s4=[-e1-e3).B+(e2+e4).A]/2$;

4) if the primary mode signal is 1 and the permutation signal is 1:

$s1=[(e1=-e3).A-(e2+e4).B]/2$, $s2=[-(e1-e3).B+(e2+e4).A]/2$, $s3=(1+e3)/2$, and $s4=(e2-e4)/2$.

39. The calculation method according to claim 35, wherein the first and second binary addresses of $\mu$ bits are generated for each butterfly circuit, each binary address corresponding to the rank of an input sample of said butterfly circuit and the second binary address being greater than the first binary address.

40. The calculation method according to claim 39, wherein, if a peripheral butterfly circuit is involved, the $\mu$–p low-order bits of the first address are equal to 0, and the $\mu$–p low-order bits of the of the second address form a number equal to $N/2^{p+1}-1$.

41. The calculation method according to claim 39, wherein said first and second binary addresses are consecutive and an internal butterfly circuit is involved.

42. The calculation method according to claim 41, wherein the address of the two other samples to be applied to the inputs of the butterfly circuit are obtained by inverting the $\mu-p$ low-order bits of both produced addresses.

43. The calculation method according to claim 42, wherein even-numbered address samples and odd-numbered address samples are stored in two separate memories.

44. The calculation method according to claim 43, wherein the value of the parameter s of the coefficient $W^s$ assigned to an internal butterfly circuit in transformation step $E_p$ is coded by $\mu-2$ bits, and is:

- if $\mu-p-1=\mu-2$, the number formed by the $\mu-p-1$ low-order bits of the second address produced for said internal butterfly circuit;
- if $\mu-p-1<\mu-2$, the number formed by the $\mu-1$ low-order bits of the second address produced for said internal butterfly circuit, followed by p-1 zero bits at the end of the number; and
- if $\mu-p-1>\mu-2$, the number by the $\mu-p-1$ low-order bits of the second address produced for said internal butterfly circuit, minus the p+1 low-order bits of the second address.

* * * * *